United States Patent [19]

Nakayama

[11] Patent Number: 5,113,287
[45] Date of Patent: May 12, 1992

[54] COMPACT ZOOM LENS WITH POSITIVE POWER FRONT LENS GROUP AND NEGATIVE POWER REAR LENS GROUP

[75] Inventor: Hiroki Nakayama, Kawasaki, Japan

[73] Assignee: Canon Kabushiki Kaisha, Tokyo, Japan

[21] Appl. No.: 758,284

[22] Filed: Aug. 28, 1991

Related U.S. Application Data

[63] Continuation of Ser. No. 350,646, May 11, 1989, abandoned.

[30] Foreign Application Priority Data

May 16, 1988 [JP] Japan ................. 63-119999

[51] Int. Cl.$^5$ .............................. G02B 15/00
[52] U.S. Cl. ........................ 359/676; 359/680; 359/683
[58] Field of Search ............ 350/423, 426, 427, 454; 359/676, 680, 683, 745, 692

[56] References Cited

U.S. PATENT DOCUMENTS

| | | | |
|---|---|---|---|
| 4,659,186 | 4/1987 | Sato et al. | 350/423 |
| 4,679,913 | 7/1987 | Sato et al. | 350/423 |
| 4,682,860 | 7/1987 | Tanaka et al. | 350/423 |
| 4,721,371 | 1/1988 | Imai | 350/427 |
| 4,770,508 | 9/1988 | Yamada et al. | 350/422 |
| 4,776,679 | 10/1988 | Kitagishi et al. | 350/427 |
| 4,815,830 | 3/1989 | Sato et al. | 350/427 |
| 4,830,474 | 5/1989 | Nakayama et al. | 350/422 |
| 4,838,669 | 6/1989 | Ogata et al. | 350/426 |
| 4,842,386 | 6/1989 | Kitagishi et al. | 350/427 |

FOREIGN PATENT DOCUMENTS

| | | |
|---|---|---|
| 49-29146 | 3/1974 | Japan . |
| 60-170816 | 9/1985 | Japan . |
| 60-191217 | 9/1985 | Japan . |
| 62-138817 | 6/1987 | Japan . |

*Primary Examiner*—Paul M. Dzierzynski
*Attorney, Agent, or Firm*—Fitzpatrick, Cella, Harper & Scinto

[57] ABSTRACT

A high-magnification zoom lens having a compact size has a front lens group of positive refractive power and a rear lens group of negative refractive power which groups are aligned in that order from the object side. The front lens group includes five lens elements and satisfies the following conditions.

$$0.015 < D2/fW < 0.07$$

$$0.06 < D3/fW < 0.2$$

$$0.005 < D5/fW < 0.018$$

where D2 is the air separation interval between the first and second lens elements; D5 is the air separation interval between the third and fourth lens elements; D3 is the center thickness of the second lens element; and fW is the focal length of the overall zoom lens system when it is set at its wide-angle end.

10 Claims, 19 Drawing Sheets

COMPACT ZOOM LENS WITH POSITIVE POWER FRONT LENS GROUP AND NEGATIVE POWER REAR LENS GROUP

This application is a continuation of application Ser. No. 07/350,646 filed May 11, 1989 now abandoned.

BACKGROUND OF THE INVENTION

1. Field of the Invention

The present invention relates to a zoom lens having a compact size suitable for use in a lens shutter camera, a video camera or the like and, more particularly, to a zoom lens of compact size which has a zoom ratio between approximately 2x-2.5x, appropriately corrected aberrations and a reduced overall lens length (defined as the distance between the first lens surface and the image surface).

2. Description of the Related Art

In the recent situation in which lens shutter cameras, video cameras and the like have been undergoing miniaturization, it is desired to develop a compact zoom lens whose overall lens length is reduced. In particular, in the field of compact cameras such as lens shutter cameras of the non-interchangeable lens type, there is a need for cameras provided with zoom lenses. Therefore, it is desired to develop a zoom lens whose overall length is approximately the same as that of a single-focus lens of the type which has heretofore been used in such a camera.

Various kinds of zoom lenses which include a standard angle of view (or photographic angle of view of $2\omega = 47$ degrees, that is, a focal length of approximately 50 mm in terms of the angle of view of a 35-mm still camera) are proposed in, for example, Japanese Patent Publication No. 29146/1974. These kinds of zoom lenses consist of two lens groups: a front lens group of negative refractive power and a rear lens group of positive refractive power, with the front and rear lens groups being aligned in that order from the object side. Such zoom lenses are arranged so that the magnification can be varied by altering the interval distance between the front and rear lens groups. Since the negative and positive refractive powers are axially distributed in that order from the object side and a relatively long back focal length can be ensured, such zoom lenses are suitable for use in a single reflex camera. However, such conventional zoom lenses have the disadvantage that the overall lens length is excessively long relative to the overall size of a typical lens shutter camera.

To solve this problem, in the commonly assigned U.S. Pat. No. 4,682,860 (which is based on Japanese Patent Laid-open Nos. 128911/1981 and 201213/1982), the assignee has previously proposed a compact zoom lens consisting of two lens groups: a front lens group of positive refractive power and a rear lens group of negative refractive power, with the front and rear lens groups being aligned in that order from the object side. This compact zoom lens is so arranged that its magnification can be varied by altering the air separation interval between the front and rear lens groups. As disclosed in U.S. Pat. No. 4,682,860, a zoom lens of the telephoto type has the positive and negative refractive powers axially distributed in that order from the object side and a relatively short back focal length, a zoom ratio of approximately 1.5x and a reduced overall lens length.

This type of zoom lens is also described in U.S. Pat. No. 4,679,913 and Japanese Patent Laid-open Nos. 138817/1987 and 92909/1987. Japanese Patent Laid-open No. 48009/1985 (U.S. Ser. No. 643,820), Japanese Patent Laid-open No. 170816/1985, U.S. Pat. No. 4,659,186, and Japanese Patent Laid-open No. 191217/1985 disclose other related art.

SUMMARY OF THE INVENTION

It is, therefore, an object of the present invention to provide a compact zoom lens which represents an improvement over the zoom lens proposed previously in U.S. Pat. No 4,682,860 by the assignee.

It is another object of the present invention to provide a compact zoom lens which has a zoom ratio of approximately 2-2.5x, and with appropriately corrected aberrations and a reduced overall zoom lens length.

To achieve the above objects, in accordance with one aspect of the present invention, there is provided a zoom lens of compact size which has a front lens group of positive refractive power and a rear lens group of negative refractive power which are aligned in that order from the object side. The zoom lens is so arranged that its magnification can be varied by altering the air separation interval between the front lens group and the rear lens group. The front lens group includes a first meniscus-shaped lens element of positive refractive power with a convex surface that faces the object side of the zoom lens, a second lens element with opposite lens surfaces that are concave, a third lens element with opposite lens surfaces that are convex, a fourth positive lens element with a convex surface that faces the image-surface side of the zoom lens, and a fifth positive lens element with convex surface that faces the image-surface side, the second lens and the third lens elements constituting a cemented lens. The front and rear lens groups are constructed and arranged to satisfy the following conditions:

$$0.015 < D2/fW < 0.07$$

$$0.06 < D3/fW < 0.2$$

$$0.005 < D5/fW < 0.018$$

where D2 represents the air separation interval between the first lens and the second lens elements; D5 represents the air separation interval between the third lens element and the fourth lens element; D3 represents the center thickness of the second lens element; and fW represents the focal length of the overall zoom lens system when it is set at its wide-angle end.

In accordance with another aspect of the present invention, there is provided a compact zoom lens having a front lens group of positive refractive power and a rear lens group of negative refractive power which are aligned in that order from the object side of the compact zoom lens, the zoom lens being so arranged that its magnification can be varied by altering the air separation interval between the front lens group and the rear lens group. In a zoom lens construction as provided by this invention, the following conditions, for the values of N2X, are satisfied:

$$0.7 < |\Delta 2|/(fT - fW) < 1.0$$

$$1.55 < N2X_i < 1.8$$

$$45 < \nu 2N_{MIN}$$

$$\nu 2P_{MAX} < 40$$

where Δ2 represents the amount of movement of the rear lens group during zooming, fW represents the focal length of the overall zoom lens when it is set at the wide-angle end thereof, fT represents the focal length of the overall zoom lens when it is set at the telephoto end thereof, N2Xi represents the refractive index of the material of the ith lens of the rear lens group, $\nu 2P_{MAX}$, represents the highest Abbe number of the material from all of the positive lens materials which constitute the rear lens group, and $\nu 2N_{MIN}$ represents the lowest Abbe number of the material from all of the negative lens materials which constitute the rear lens group.

The above and other objects, features and advantages of the present invention will be apparent from the following description of preferred embodiments of the invention with reference to the accompanying drawings.

DESCRIPTION OF PREFERRED EMBODIMENTS

Figure 1:
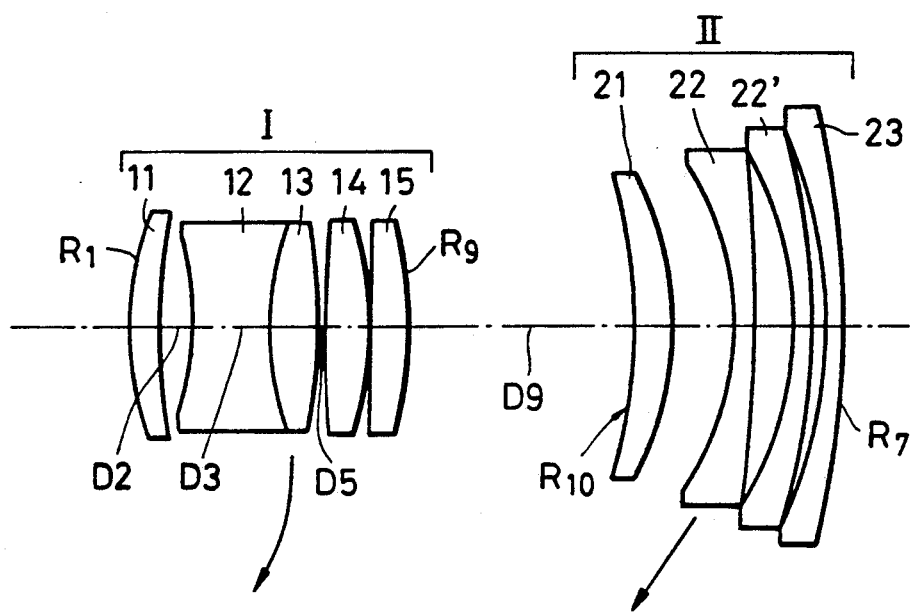
FIG. 1 is a diagrammatic cross-sectional view showing a zoom lens which is set at its wide-angle end, and serves to illustrate a first embodiment corresponding to numerical example 1.
Figure 2:
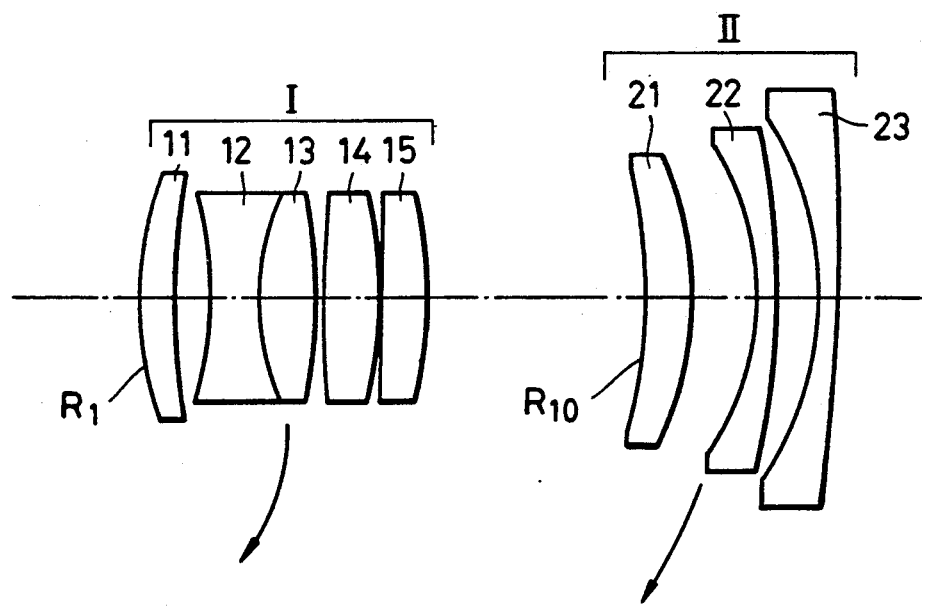
FIG. 2 is a diagrammatic cross-sectional view showing a zoom lens which is set at its wide-angle end, and serves to illustrate a second embodiment corresponding to numerical example 2.
Figure 3:
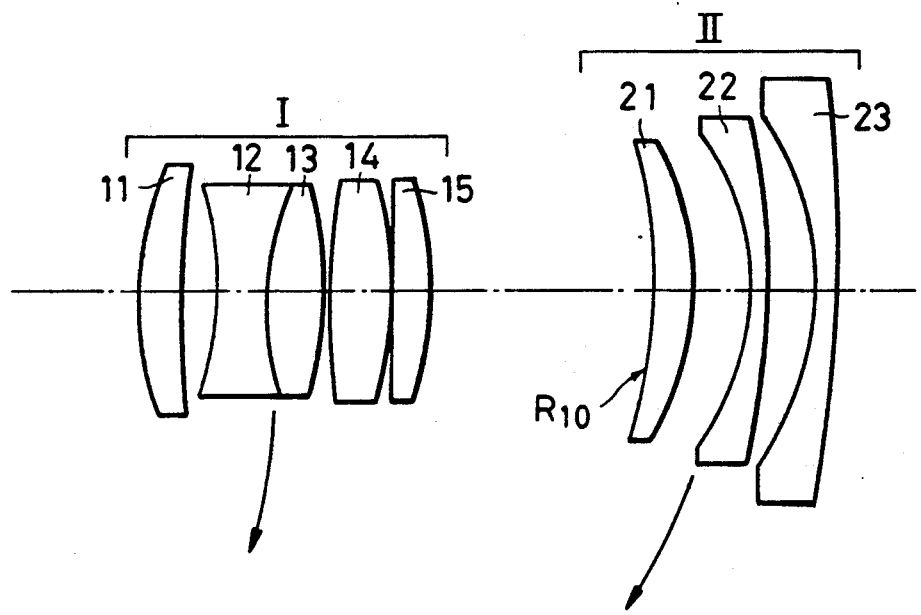
FIG. 3 is a diagrammatic cross-sectional view showing a zoom lens which is set at its wide-angle end, and serves to illustrate a third embodiment corresponding to numerical example 3.
Figure 4:
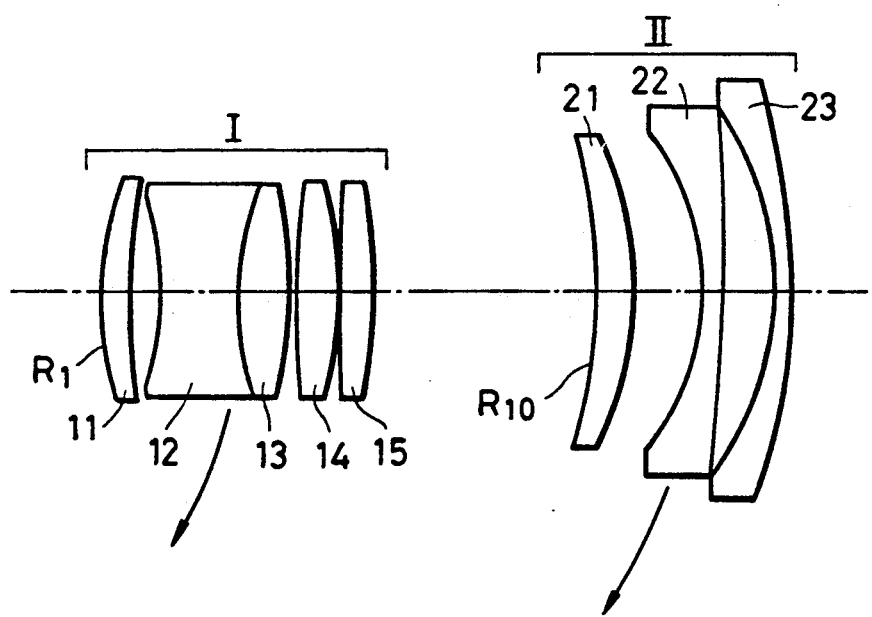
FIG. 4 is a diagrammatic cross-sectional view showing a zoom lens which is set at its wide-angle end, and serves to illustrate a fourth embodiment corresponding to numerical example 4.
Figure 5A:
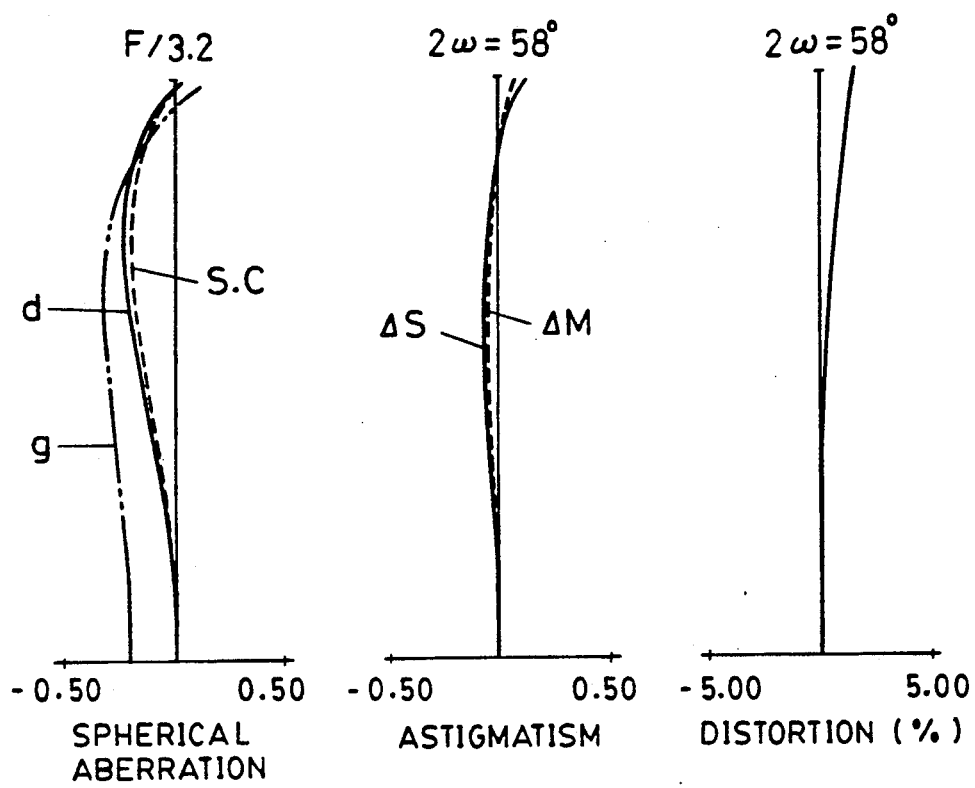
FIGS. 5(A), 5(B) and 5(C) are graphic representations showing aberrations of a zoom lens to which numerical example 1 is applied.
Figure 5B:
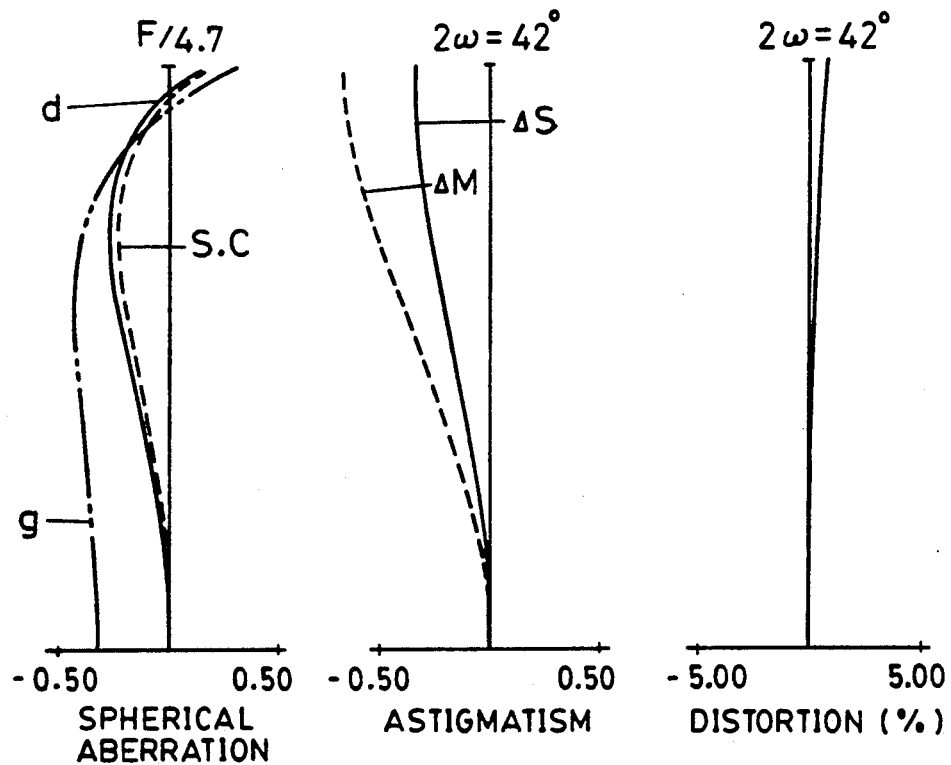
Figure 5C:
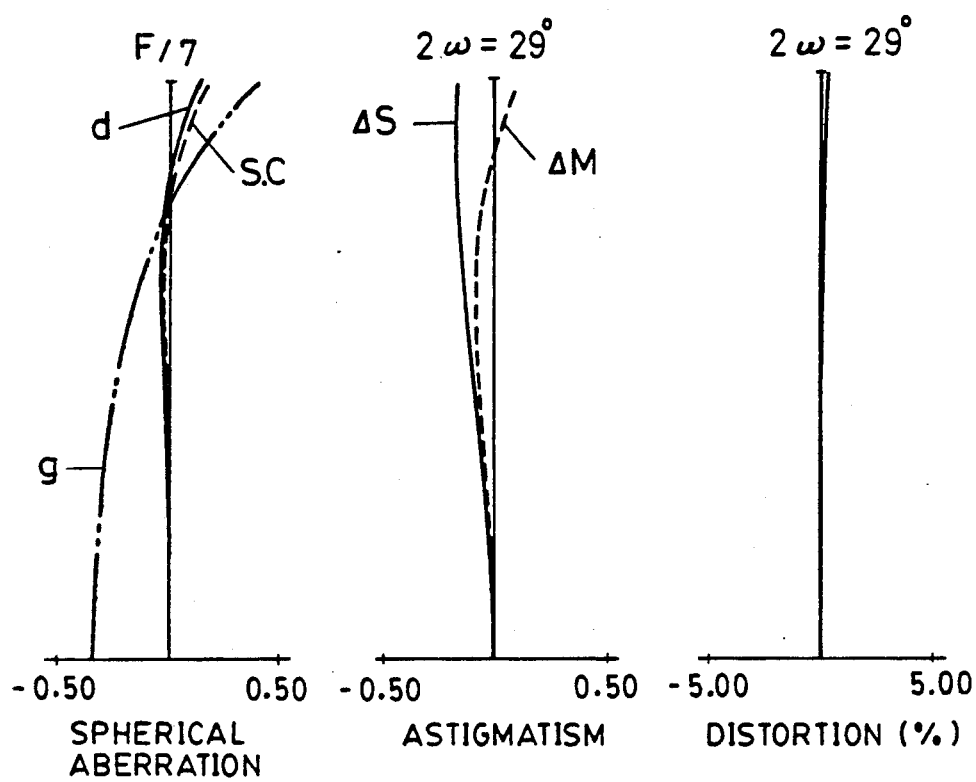
Figure 6A:
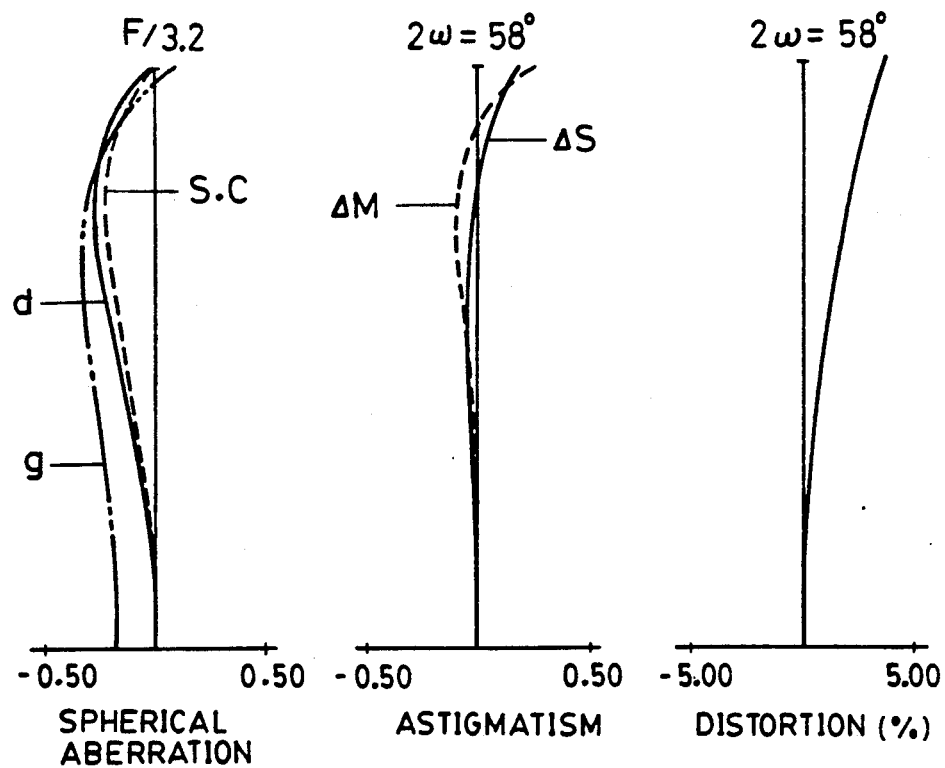
FIGS. 6(A), 6(B) and 6(C) are graphic representations showing aberrations of a zoom lens to which numerical example 2 is applied.
Figure 6B:
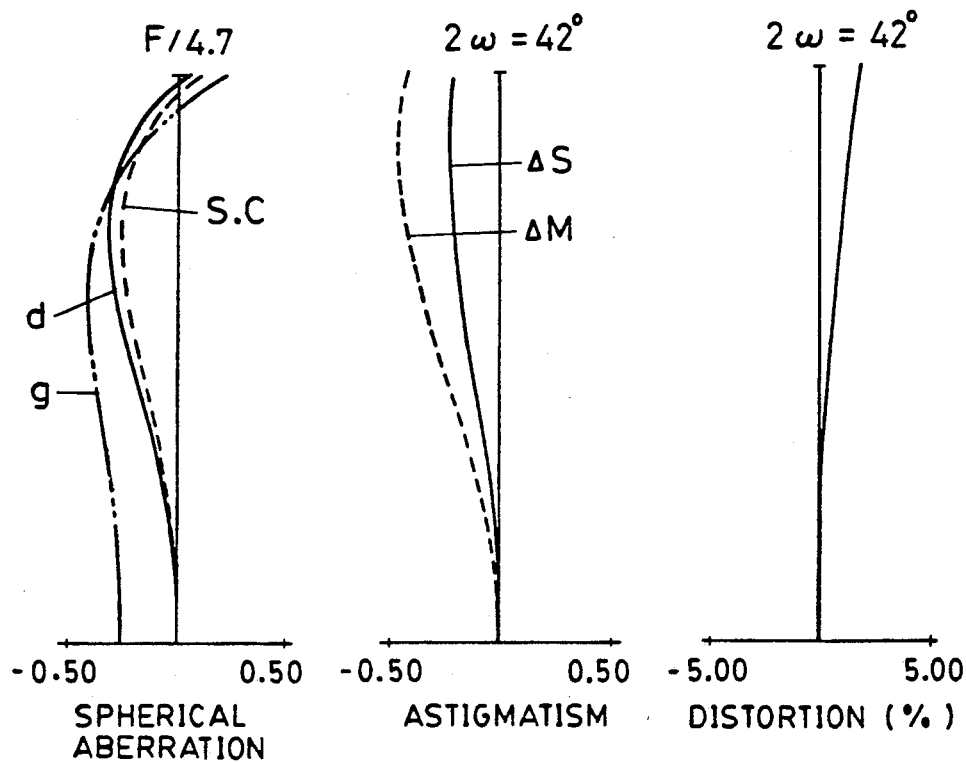
Figure 6C:
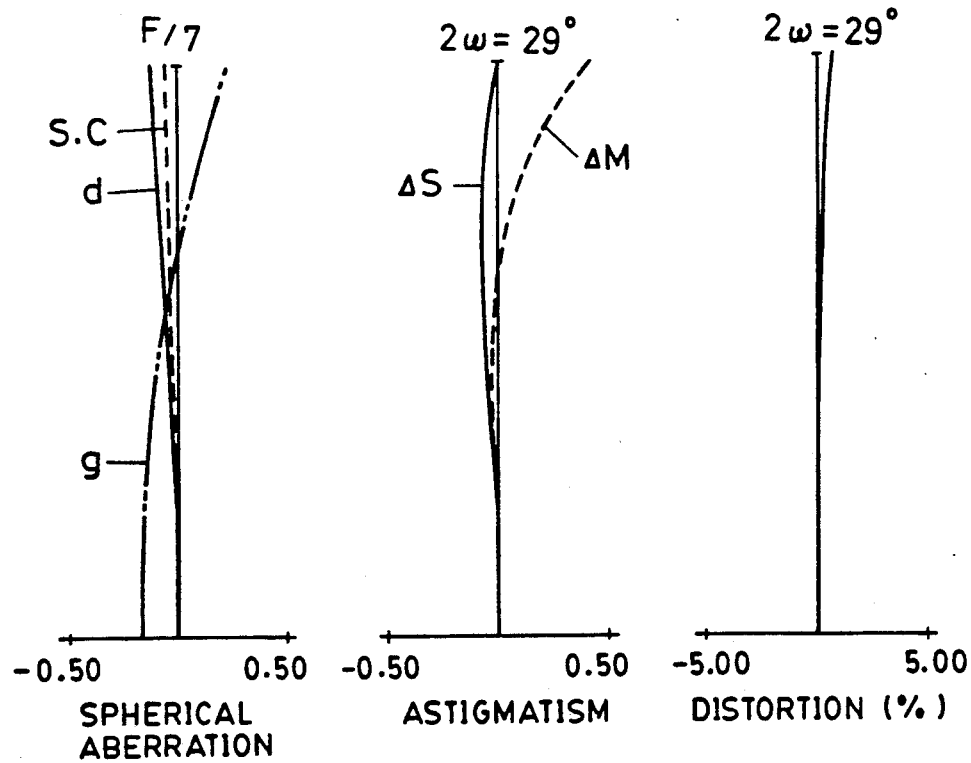
Figure 7A:
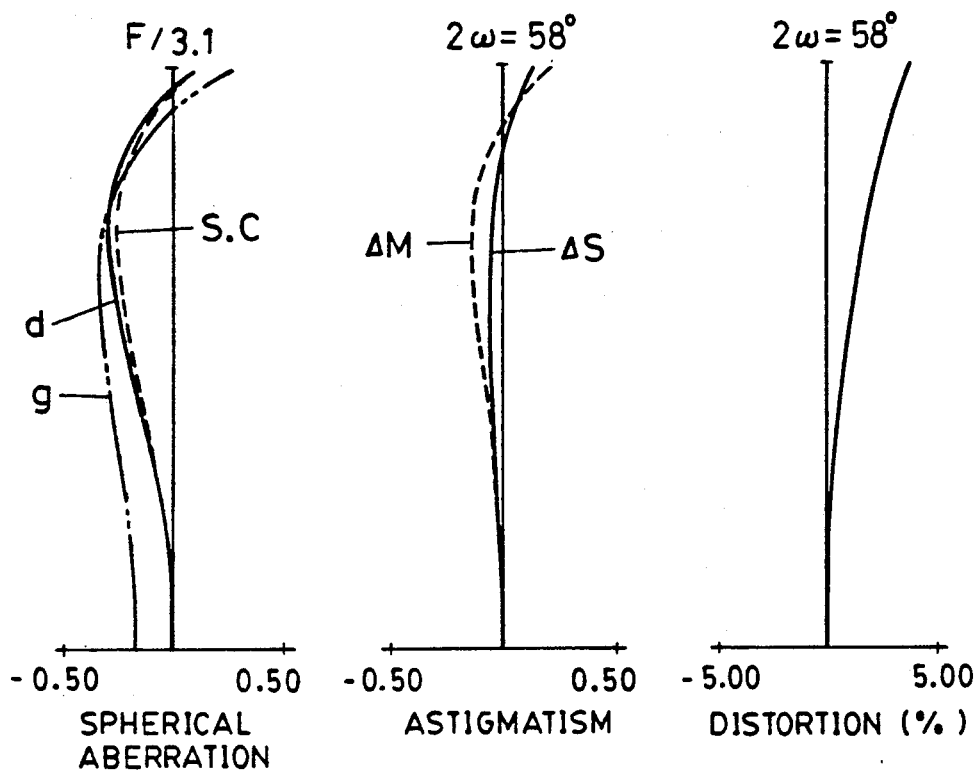
FIGS. 7(A), 7(B) and 7(C) are graphic representations showing aberrations of a zoom lens to which numerical example 3 is applied.
Figure 7B:
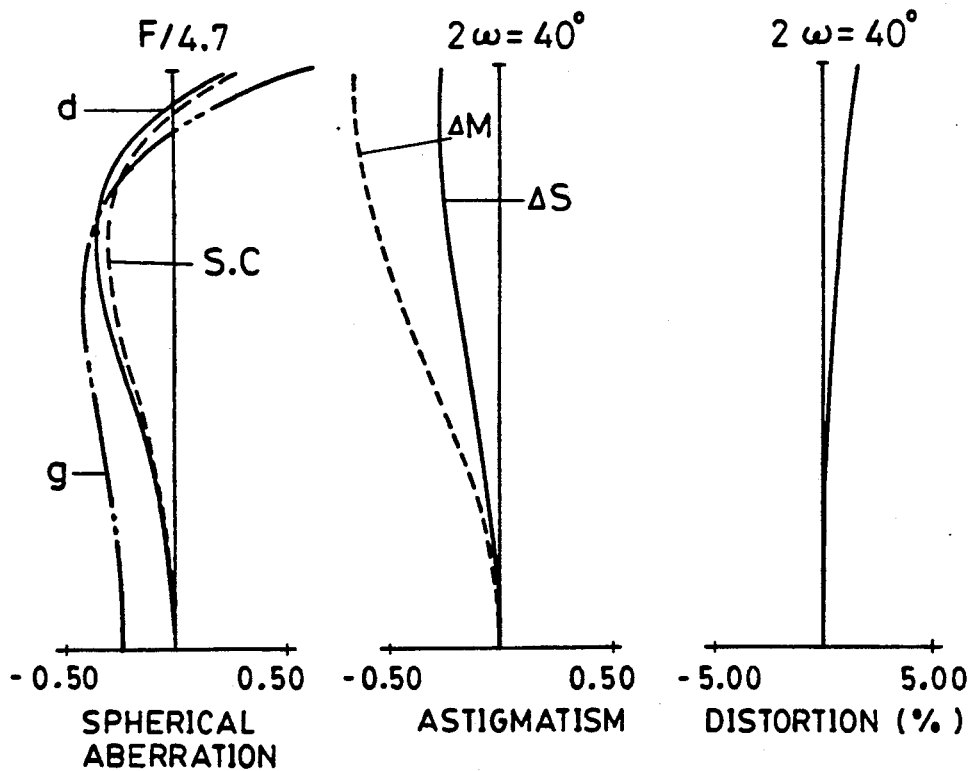
Figure 7C:
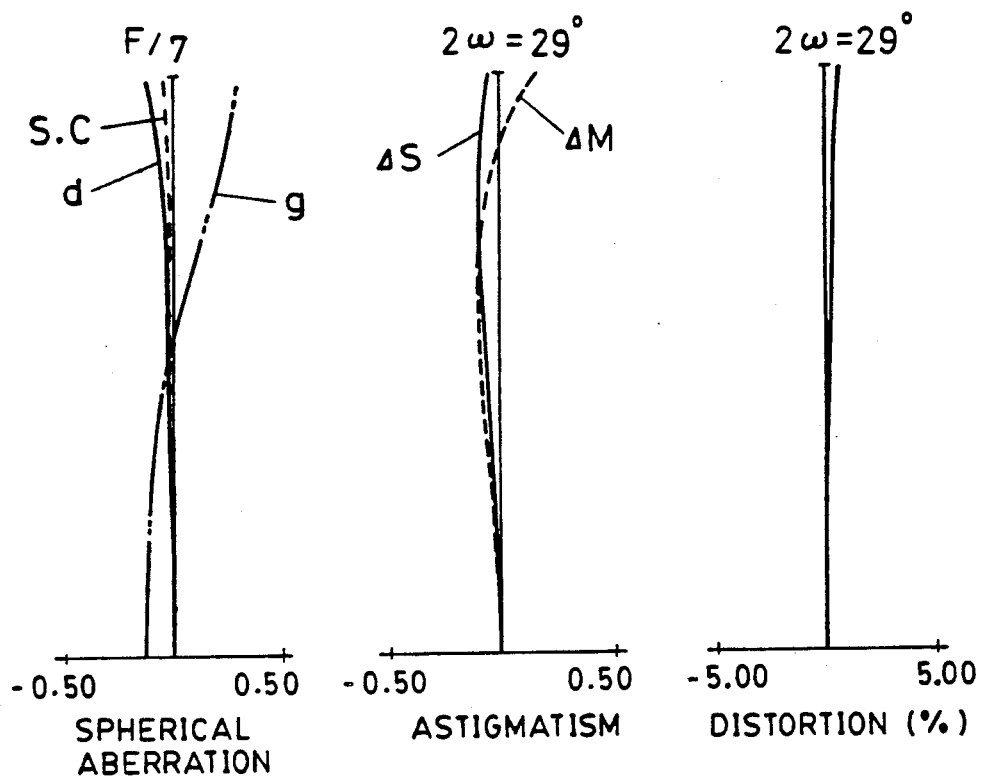
Figure 8A:
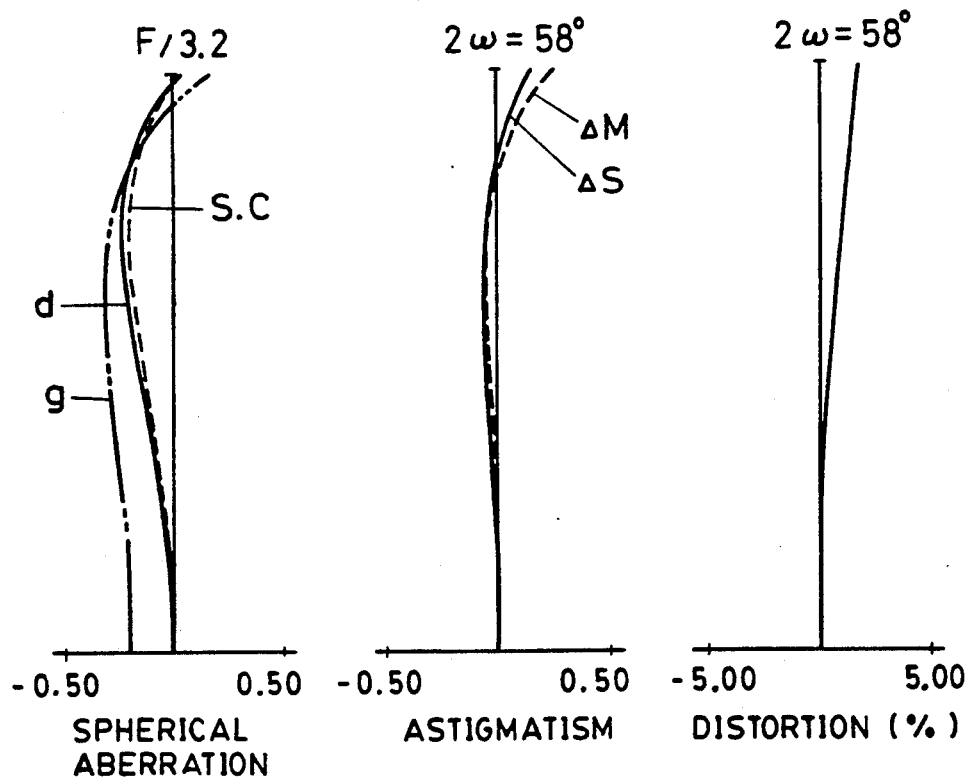
FIGS. 8(A), 8(B) and 8(C) are graphic representations showing aberrations of a zoom lens to which numerical example 4 is applied.
Figure 8B:
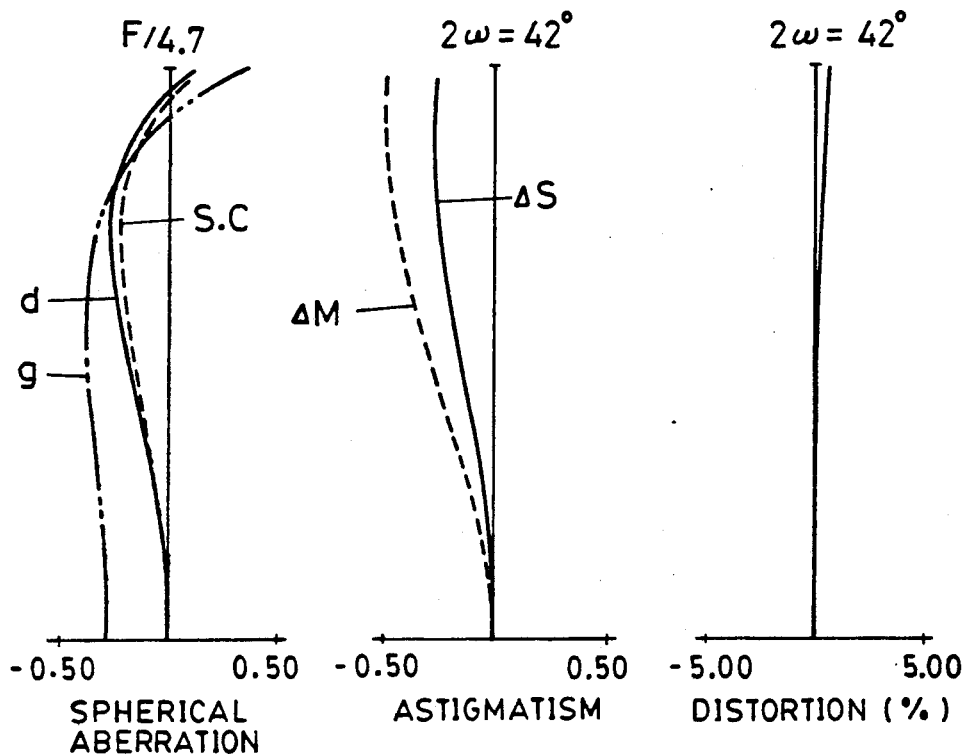
Figure 8C:
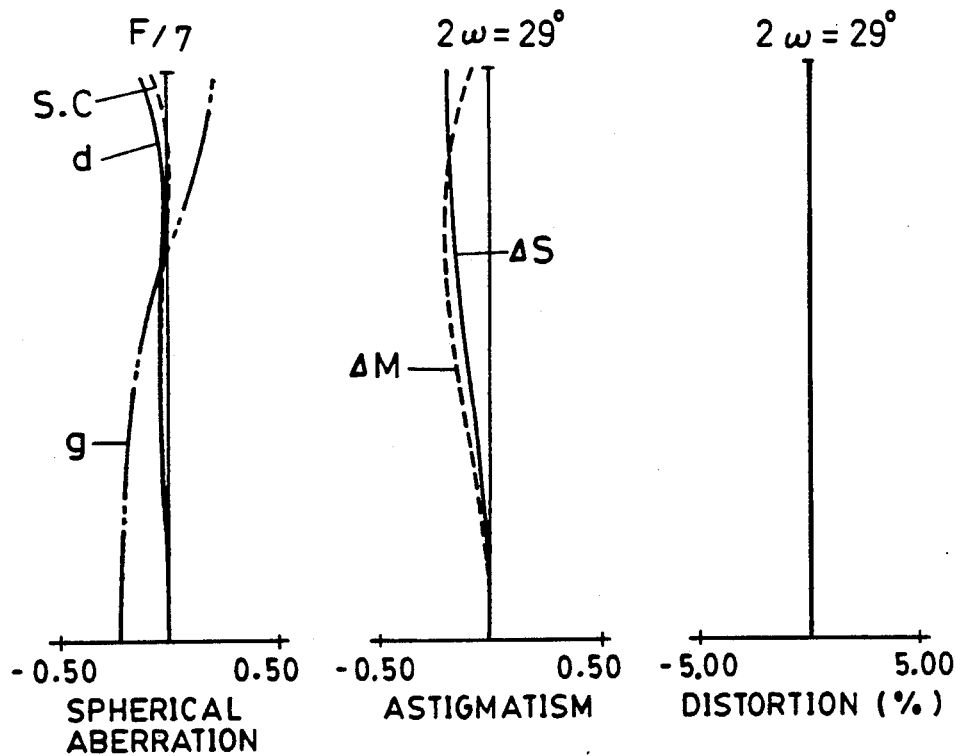

Preferred embodiments of the present invention will be described below with reference to the accompanying drawings.

In each embodiment which will be described later, a zoom lens of compact size has two lens groups: an object-side lens group (front lens group) of positive refractive power and an image-side lens group (rear lens group) of negative refractive power which are aligned in that order from an object side. This zoom lens is so arranged that its magnification can be varied by altering the air separation interval between the front lens group and the rear lens group. The front lens group includes a meniscus-shaped first lens element 11 of positive refractive power with a convex surface that faces the object side, a lens element 12 with opposite lens surfaces that are concave, a lens element 13 with opposite lens surfaces that are convex, a positive lens element 14 with a convex surface that faces the image-surface side, and a positive fifth lens element 15 with a convex surface that faces the image-side, the lens element 12 and the lens element 13 constituting a cemented lens. In the lens construction as achieved by the present invention, the following conditions are satisfied:

$$0.015 < D2/fW < 0 \tag{1}$$

$$0.06 < D3/fW < 0.2 \tag{2}$$

$$0.005 < D5/fW < 0.018 \tag{3}$$

where D2 represents the air separation between the lens element 11 and the lens element 12; D5 represents the air separation between the lens element 13 and the lens element 14; D3 represents the center thickness of the lens element 12; and fW represents the focal length of the zoom lens system when it is set at its wide-angle end.

FIGS. 1 to 4 are diagrammatic cross-sectional views of first to fourth embodiments of the present invention, and show zoom lenses which are assembled in accordance with numerical examples 1 to 4, respectively. In the figures, the respective zoom lenses are shown set at their wide-angle ends.

In each of the figures, the zoom lens includes a first lens group I of positive refractive power and a second lens group II of negative refractive power, and is so arranged that the first and second lens groups I and II can be moved toward the object side as indicated by arrows while the interval between the lens groups I and II is being decreased, thereby enabling the angle of view to be varied from its wide-angle end to its telephoto end.

In each of the above zoom lenses, the overall zoom lens length reaches its minimum at the wide-angle end and its maximum at the telephoto end. In each of these embodiments, for the sake of ensuring the portability of a camera, the zoom lens is arranged so that its overall lens length may be at its minimum at the wide-angle end.

In each of the embodiments, the first lens group I of positive refractive power has a four-lens, five-lens-element construction with the predetermined configuration as described above. Accordingly, even in the case of a two-group zoom lens having a zoom ratio of 2x or more, it is possible to achieve good correction of coma which occurs to a large extent at the wide-angle end or various other aberrations such as spherical aberration and the curvature of field due to zooming.

In particular, good correction of inward coma occurring on the wide-angle side is achieved by appropriately selecting the center thickness of the lens element 12 that has opposite lens surfaces which are concave.

The following is an explanation of the technical meanings of the above noted formulae The formula (1) concerns the air separation interval between the first lens element 11 and the second lens element 12 and is used to appropriately select the position of the principal point of the first lens group I and to prevent deterioration of field characteristics. If the upper limit of the formula (1) is exceeded, the principal point of the first lens group I is shifted forwardly and, on the telephoto side, the first lens group I and the second lens group II approach each other to an excessive extent. For this reason, the negative refractive power of the second lens element 12 must be increased. However, since the image surface would suffer from over-correction, such an increase is not desirable. On the other hand, when the lower limit of the formula (1) is exceeded and the air separation interval between the first lens element 11 and the second lens element 12 becomes excessively narrow, the spherical aberration is under-corrected. In addition, it is difficult to construct the first lens element 11 and the second lens element 12 independently.

The formula (2) concerns the center thickness of the second lens element 12, that has opposite lens surfaces which are concave and, when the upper limit of the formula (2) is exceeded, the effective diameter of the first lens group I increases and the overall size of the zoom lens system increases. Accordingly, it is not desirable to exceed the upper limit. On the other hand, when the lower limit of the formula (2) is exceeded, a large amount of inward coma is produced on the wide-angle side by the lower rays of an off-axial light-flux. Accordingly, it is not desirable to exceed the lower limit, either.

The formula (3) concerns the air separation between the third lens element 13 and the fourth lens element 14. If the upper limit of the formula (3) is exceeded, a large amount of inward coma occurs, whereas, if the lower limit of the formula (3) is exceeded, it is difficult to correct the aberrations of the entire image surface while maintaining a good balance.

In each of the above embodiments, in order to reduce the spherical aberration occurring in the first lens group I and variations in the aberrations due to zooming, it is desirable to select the configuration and the refractive power of each of the second lens element 12 and third lens element 13 so that the total refractive power of the cemented lens constituted by the second lens element 12 and the third lens element 13 may be negative.

In order to achieve good correction of the curvature of field throughout the zooming range from the wide-angle end to the telephoto end, it is particularly desirable to satisfy $$1.7 < N2 \tag{4}$$

where N2 represents the refractive index of the second lens element 12.

If this formula (4) is not satisfied, the Petzval sum becomes excessively small and the curvature of field becomes over-corrected In each of the above embodiments, in order to achieve good correction of positive distortion on the wide-angle side, it is preferable that the construction of the second lens group II of negative refractive power include at least one meniscus-shaped lens element 21 of positive refractive power with a concave surface that faces the object side.

Figure 9:
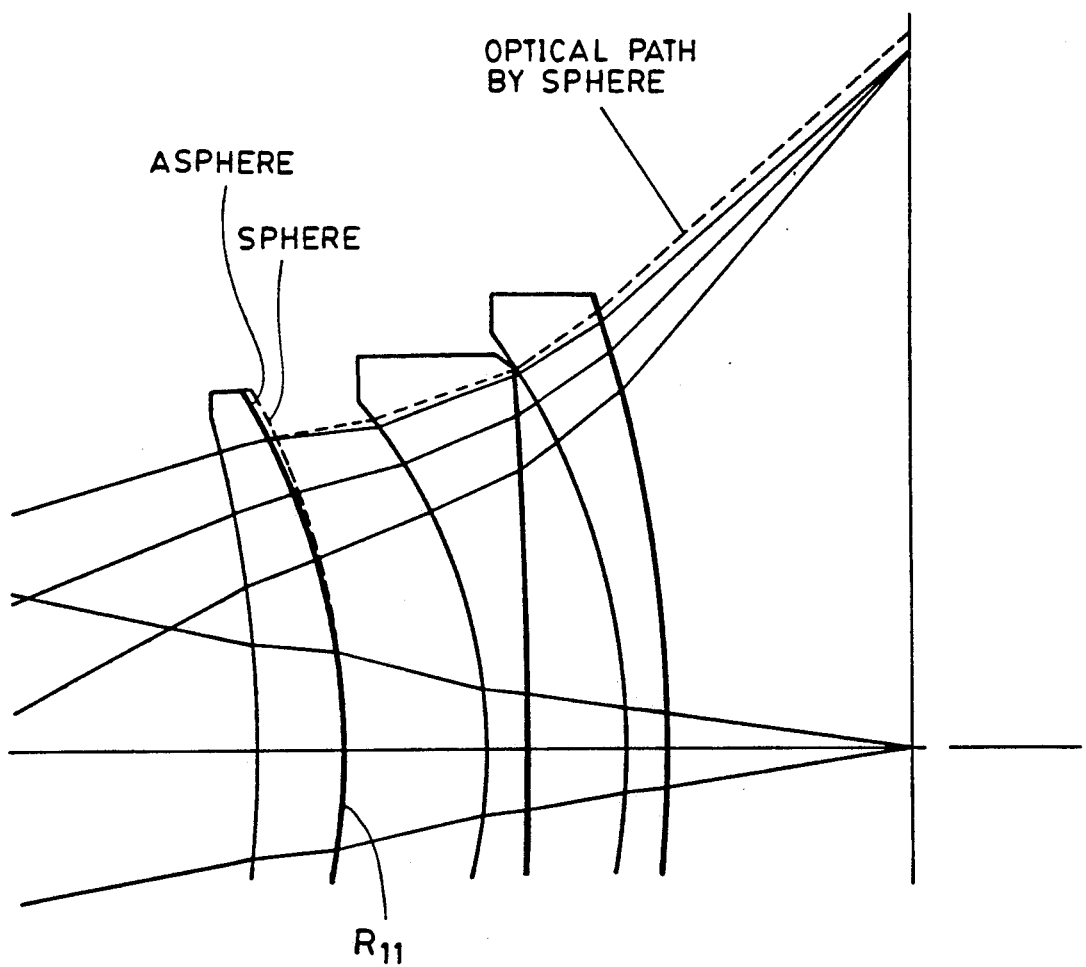
FIG. 9 is a schematic view which serves to illustrate an aspherical configuration used in the present invention.
Figure 10A:
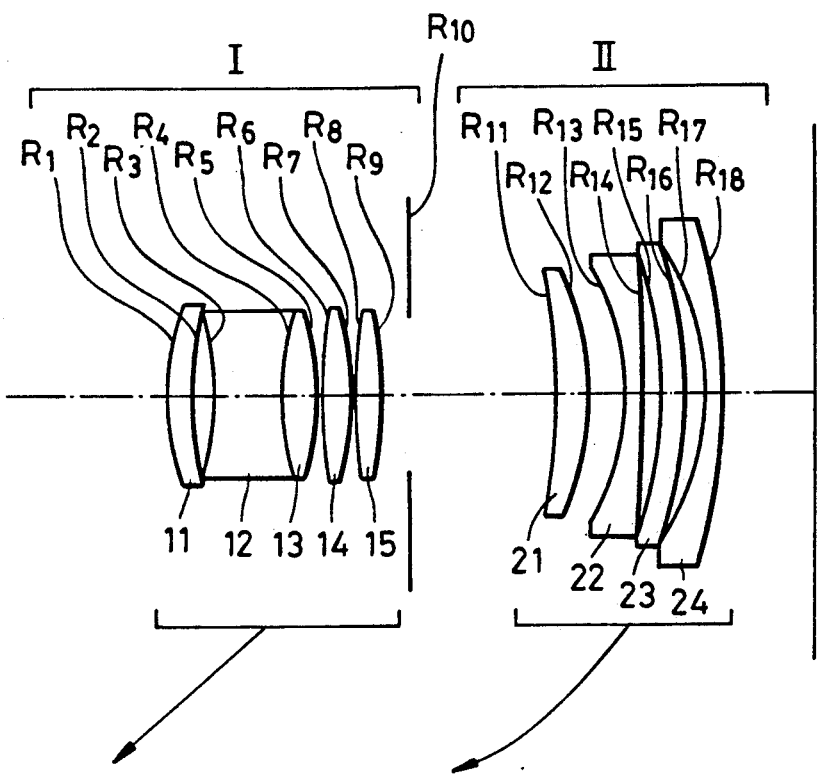
FIGS. 10(A) and 10(B) are diagrammatic cross-sectional views which serve to illustrate a fifth embodiment corresponding to numerical example 5.
Figure 10B:
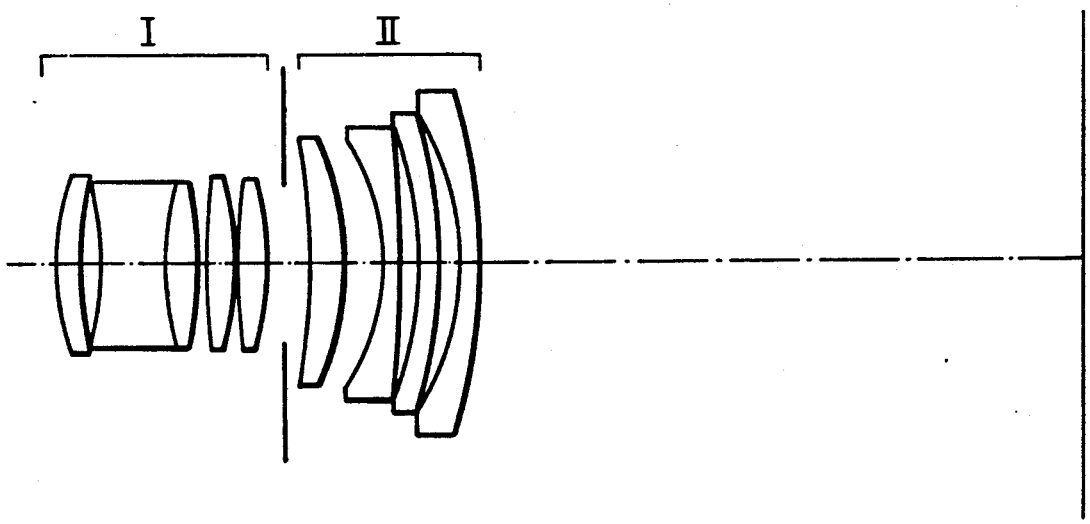
Figure 11A:
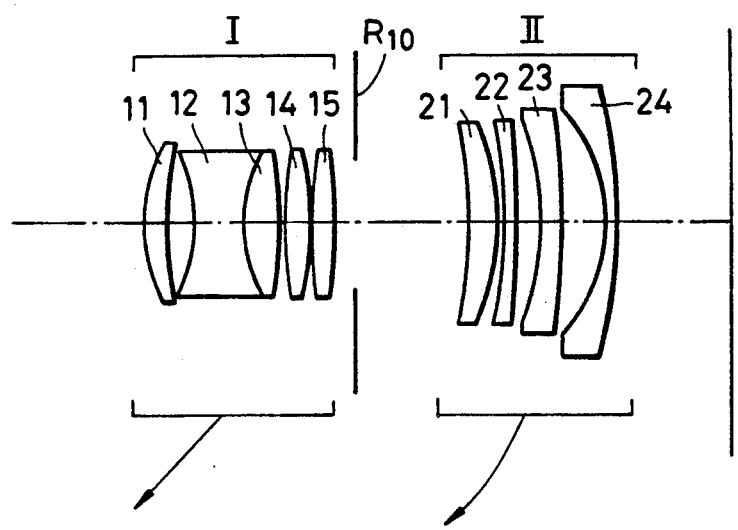
FIGS. 11(A) and 11(B) are diagrammatic cross-sectional views which serve to illustrate a sixth embodiment corresponding to numerical example 6.
Figure 11B:
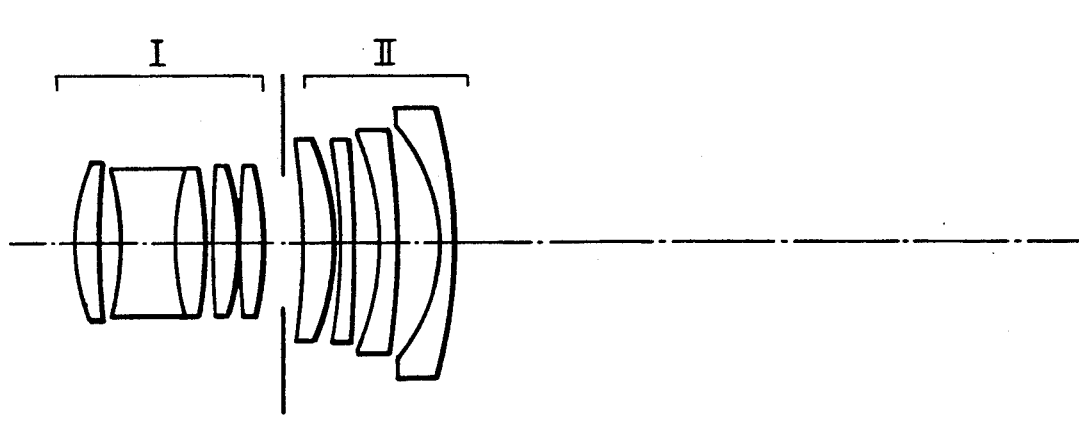
Figure 12A:
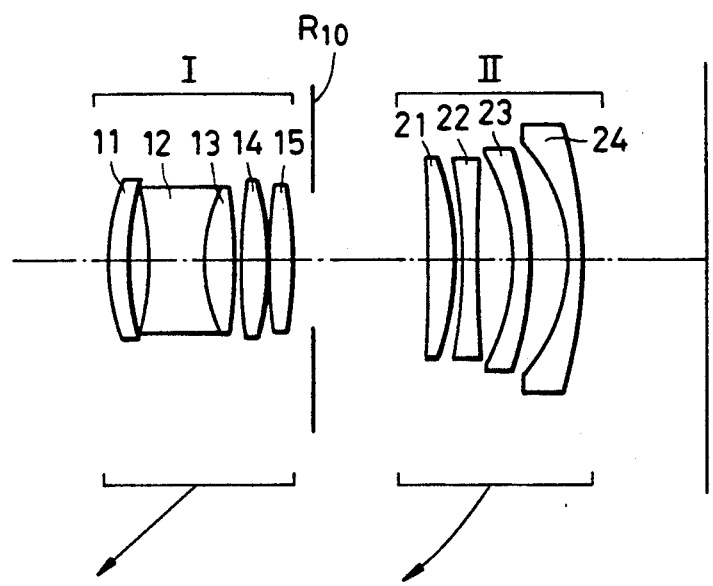
FIGS. 12(A) and 12(B) are diagrammatic cross-sectional views which serve to illustrate a seventh embodiment corresponding to numerical example 7.
Figure 12B:
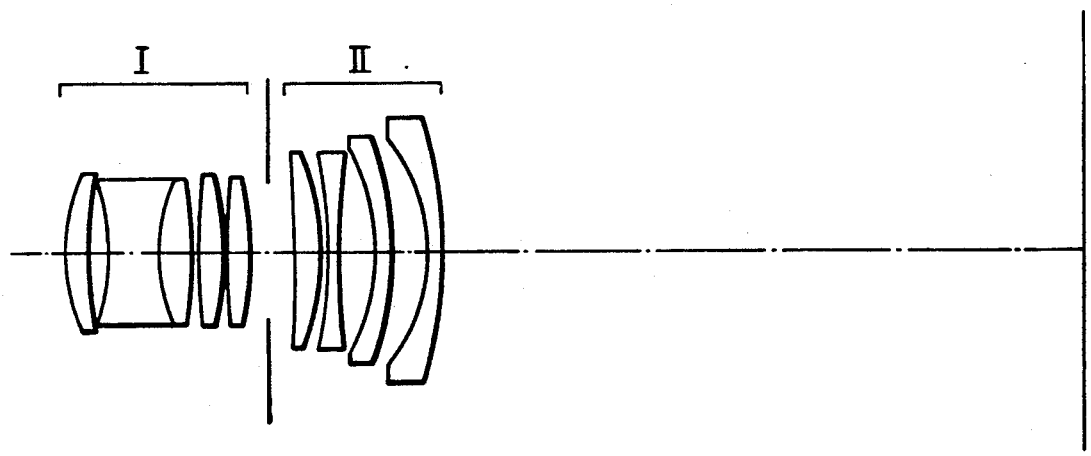
Figure 13A:
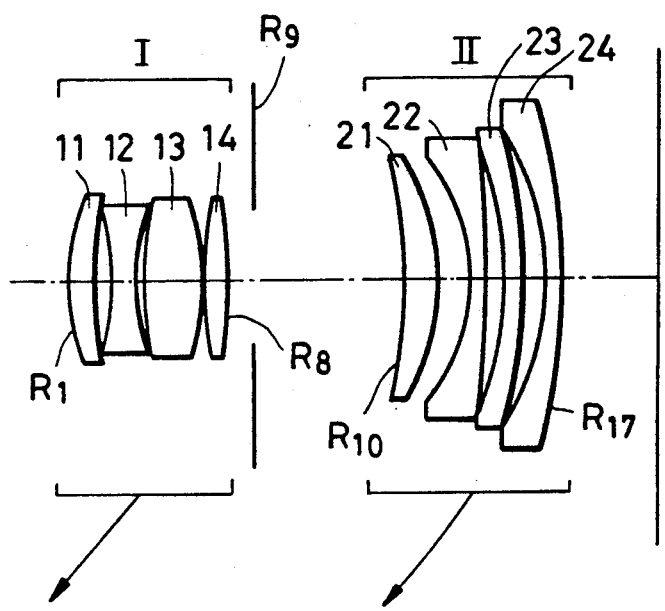
FIGS. 13(A) and 13(B) are diagrammatic cross-sectional views which serve to illustrate an eighth embodiment corresponding to numerical example 8.
Figure 13B:
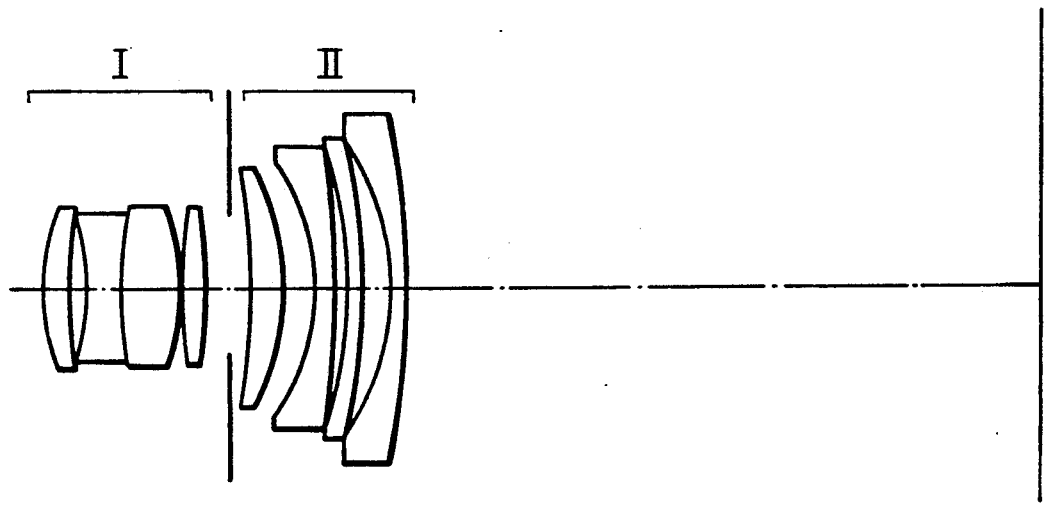
Figure 14:
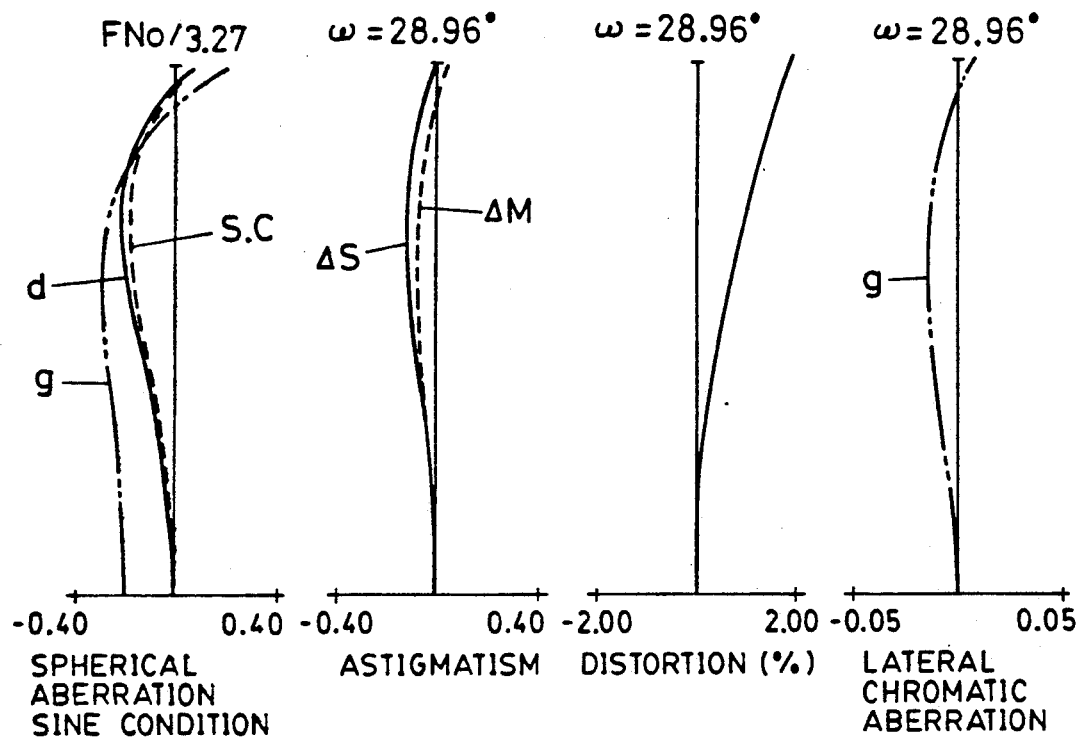
FIGS. 14(A), 14(B) and 14(C) are graphic representations showing aberrations of a zoom lens to which numerical example 5 is applied.
Figure 14:
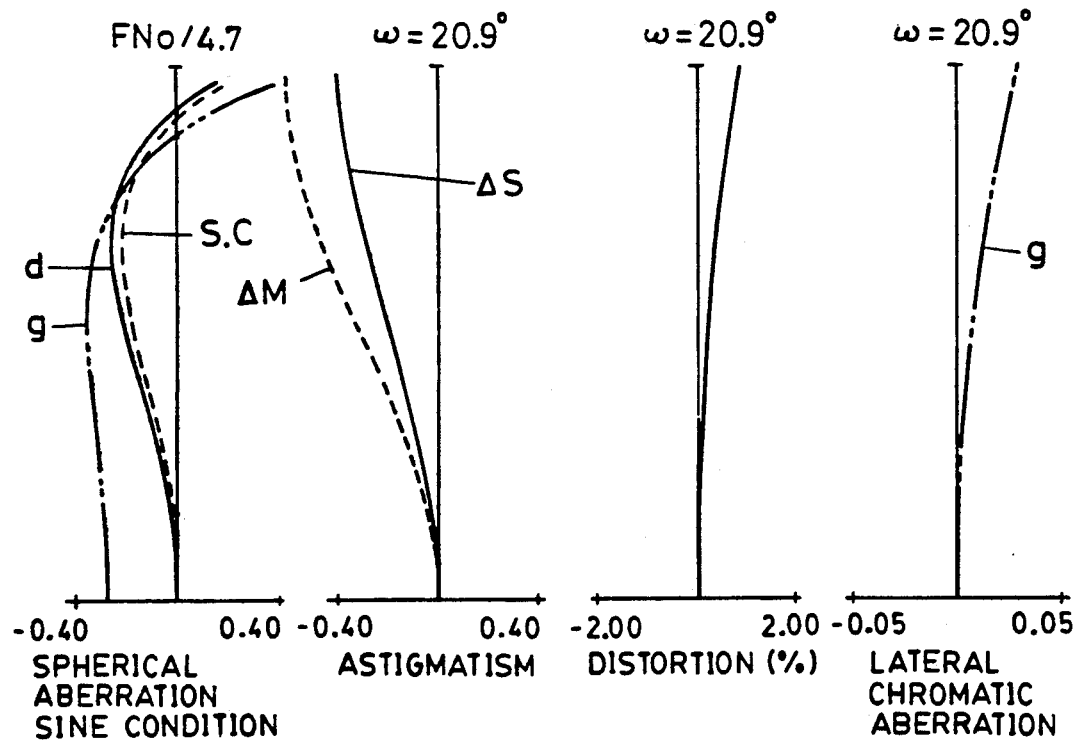
Figure 14C:
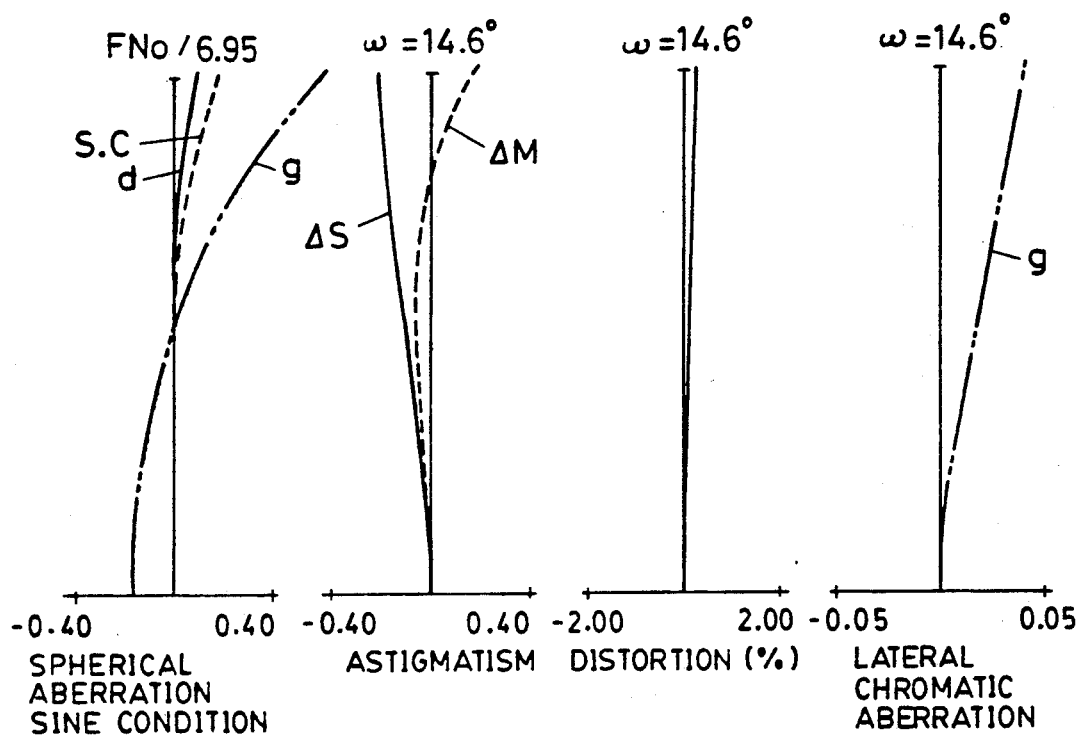
Figure 15A:
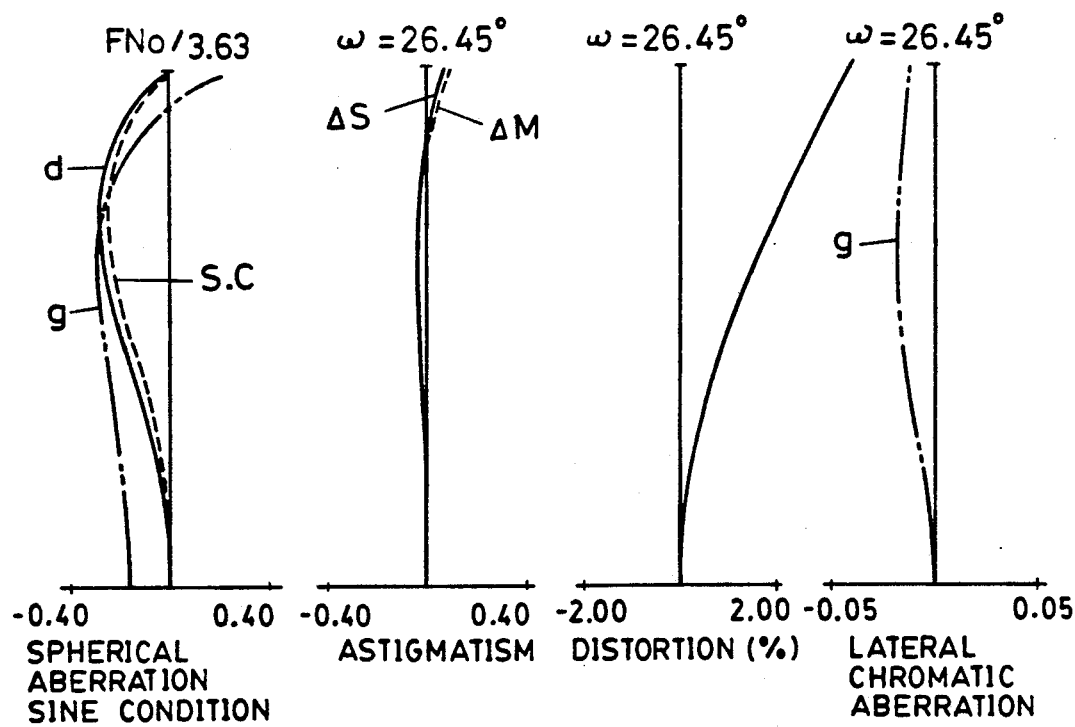
FIGS. 15(A), 15(B) and 15(C) are graphic representations showing aberrations of a zoom lens to which numerical example 6 is applied.
Figure 15B:
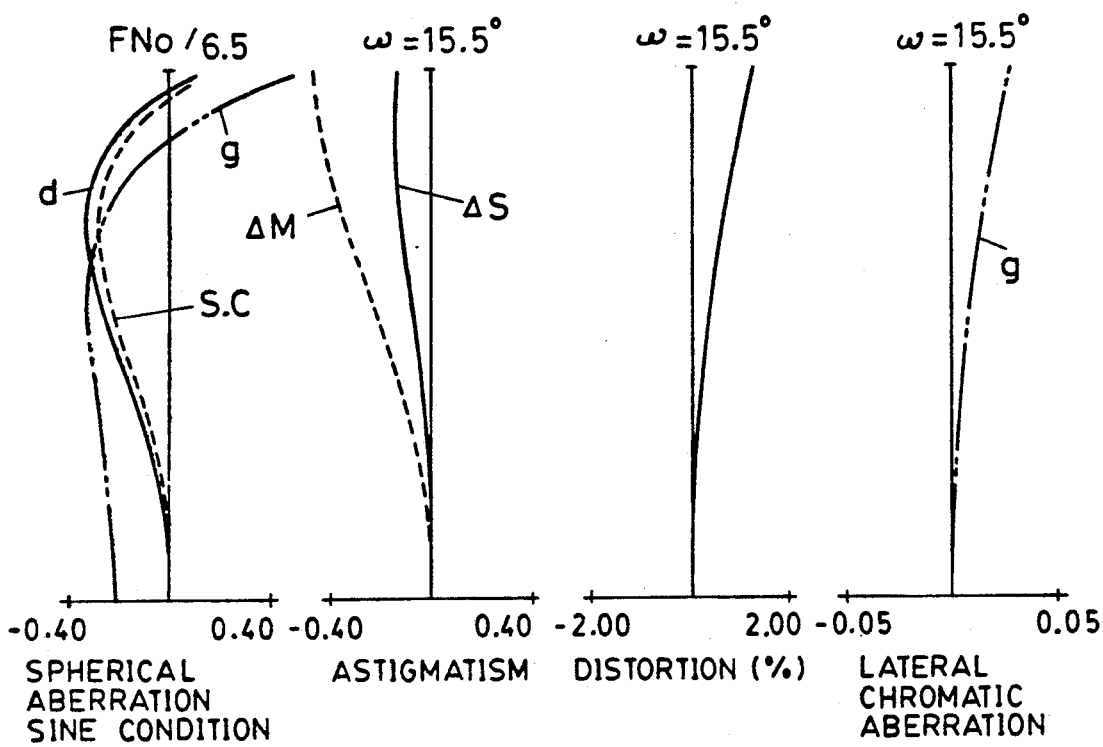
Figure 15C:
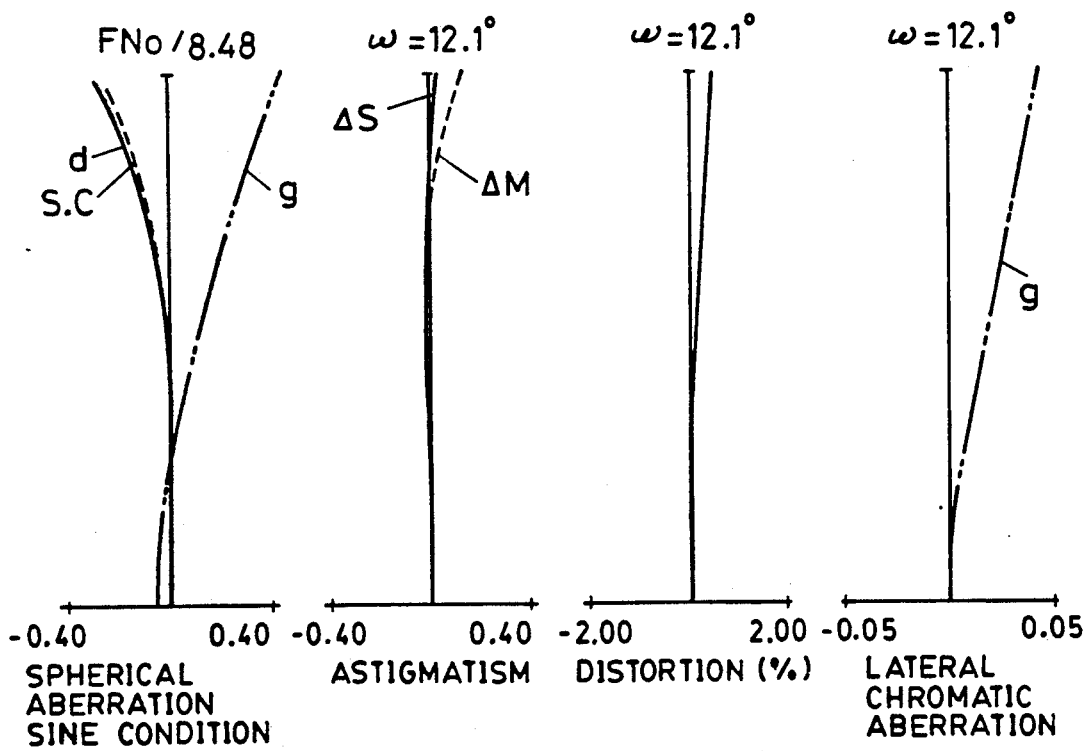
Figure 16A:
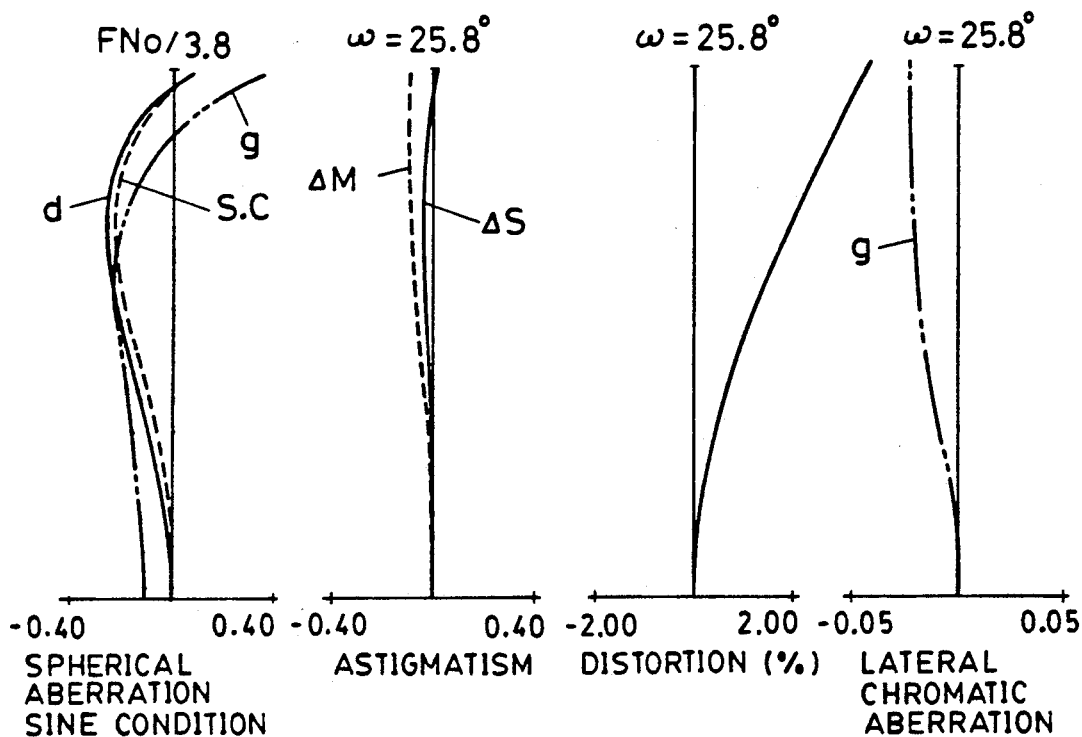
FIGS. 16(A), 16(B) and 16(C) are graphic representations showing aberrations of a zoom lens to which numerical example 7 is applied.
Figure 16B:
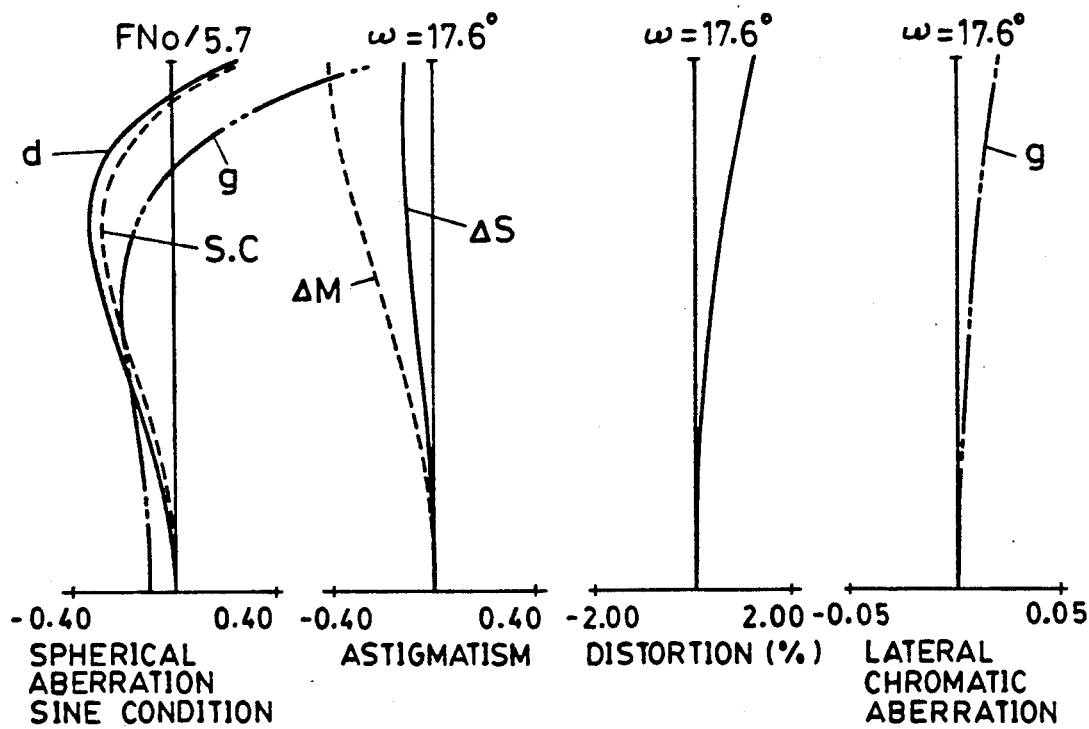
Figure 16C:
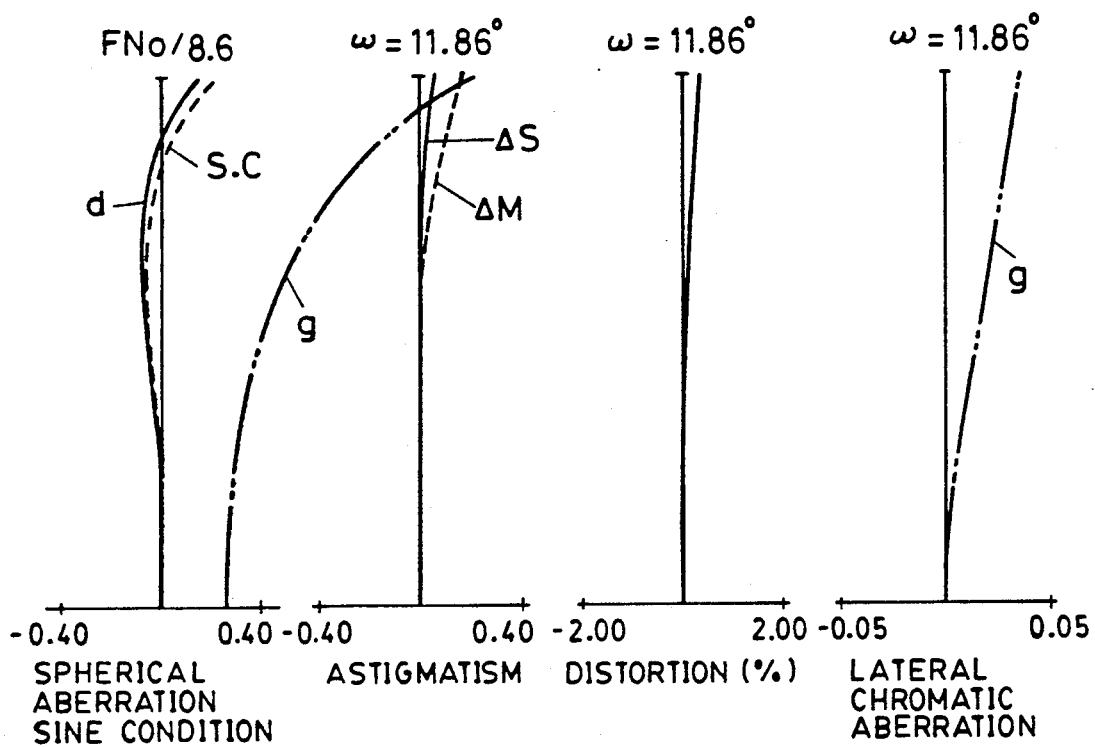
Figure 17A:
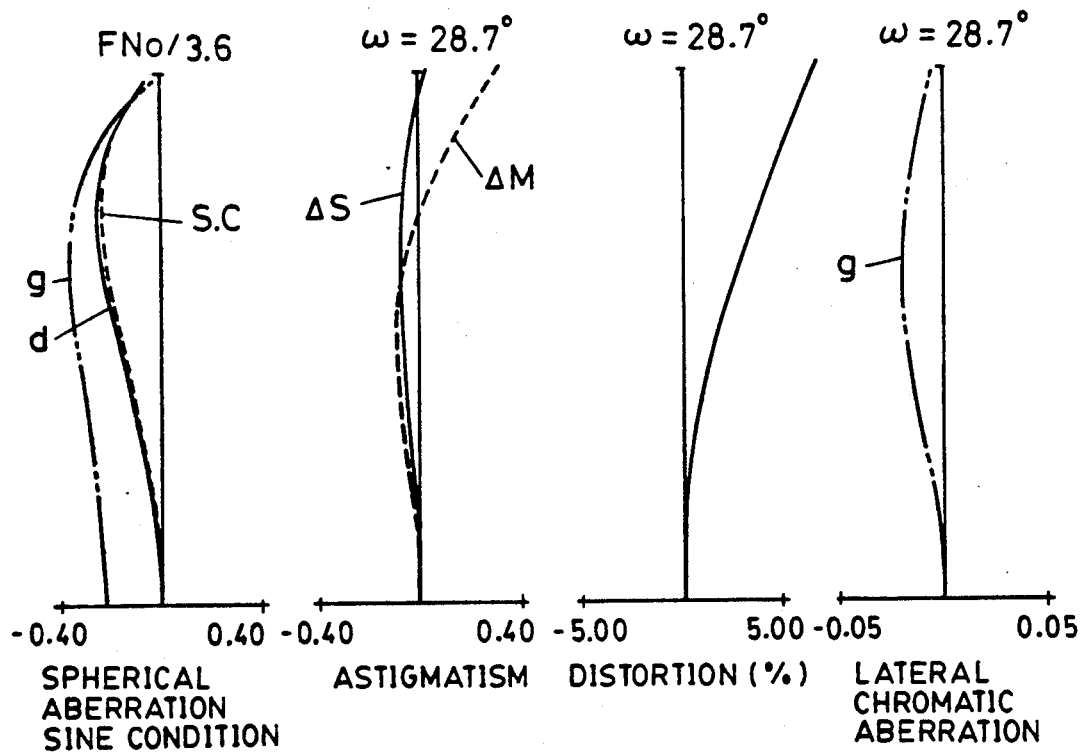
FIGS. 17(A), 17(B) and 17(C) are graphic representations showing aberrations of a zoom lens to which numerical example 8 is applied.
Figure 17B:
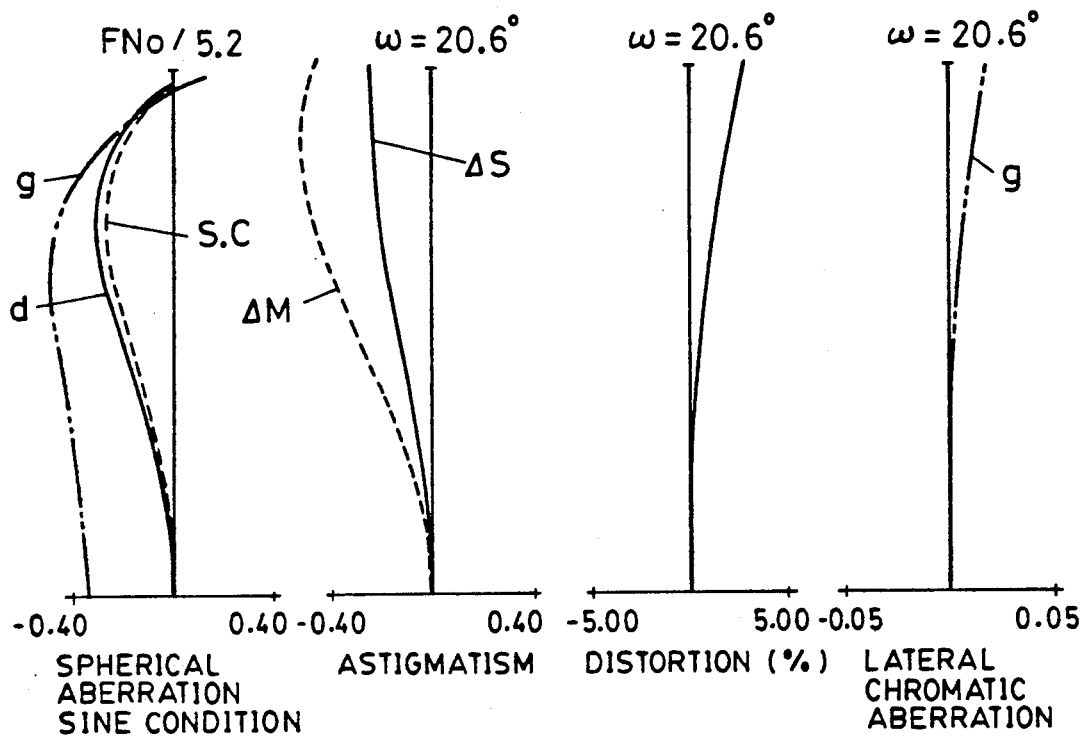
Figure 17C:
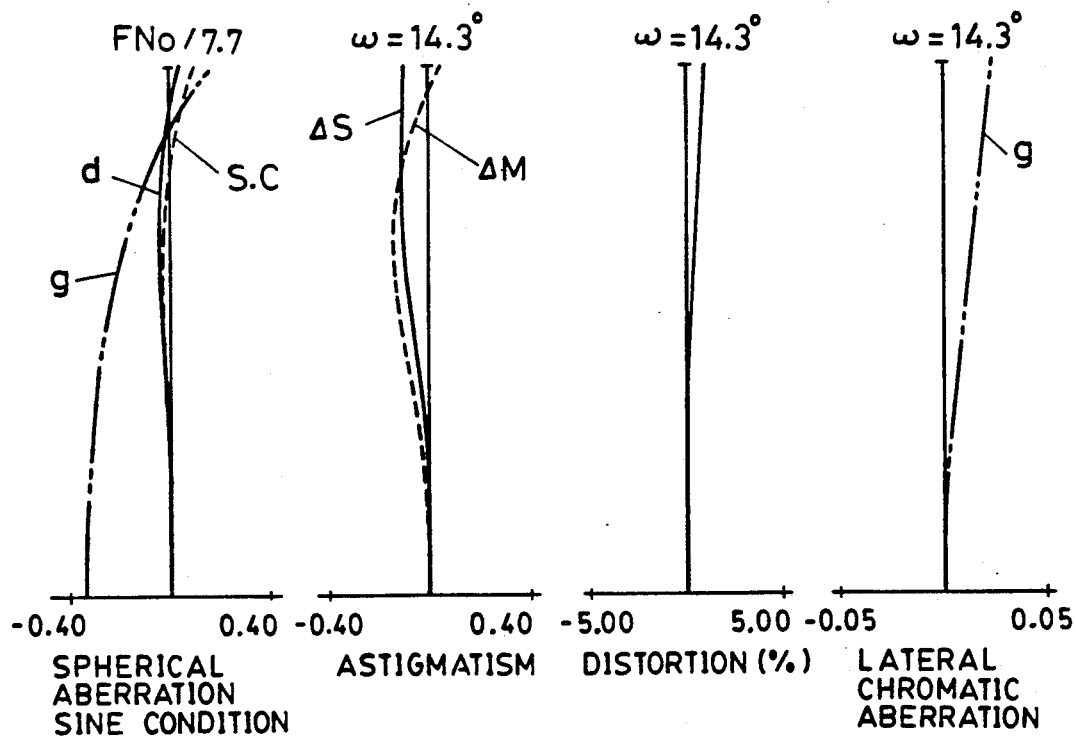

It is particularly preferable that the lens element 21 be disposed at the position nearest to the object-side in the second lens group II and that at least one lens surface of the lens element 21 be made aspherical. The aspherical configuration is preferably selected so that, as shown in FIG. 9, the positive refractive power becomes strong or the negative refractive power becomes weak toward the periphery of the lens element 21. The use of the aspherical configuration makes it possible to achieve well-balanced correction of various aberrations such as distortion on the wide-angle side, outward coma due to the upper rays of on off-axis light flux, and spherical aberration at the telephoto end.

In order to ensure high optical performance throughout the zooming range, the second lens group II is preferably constituted by at least three lens elements: a meniscus-shaped lens element 21 of positive refractive power with a concave surface that faces the object side, at least one meniscus-shaped lens element 22 of negative refractive power with a concave surface that faces the object side, and at least one meniscus-shaped lens element 23 of negative refractive power with a concave surface that faces the object side.

In a case where the lens element 21 is constituted not by an aspherical lens but by a spherical lens, at least one meniscus-shaped lens element 22' of negative refractive power with a concave surface that faces the object side is preferably inserted between the lens element 22 and the lens element 23.

In particular, in order to achieve good correction of the image surface, it is preferable that the convex lens surfaces of all of the lenses that constitute the second lens group II are arranged to face the image-side.

In each of the above embodiments, in order to achieve good correction of over-corrected spherical aberration which tends to occur on the telephoto side and variations in the spherical aberration due to zooming, it is preferable that, on the basis of an acceptable third-order aberration coefficient at its wide-angle end, a third-order spherical aberration coefficient It at the telephoto end for an object at infinity is determined as follows:

$$0.5 < It < 4 \tag{5}$$

When the upper limit of the formula (5) is exceeded, the spherical aberration caused by zooming from the wide-angle end to the telephoto end is under-corrected, whereas, when the lower limit is exceeded, the spherical aberration on the telephoto end is over-corrected.

In order to reduce the overall size of the lens system while maintaining its optical performance at a satisfactory level, if D9W represents the air separation interval between the first lens group I and the second lens group II, D9W is preferably selected as follows:

$$0.3 < D9W/fW < 0.5 \tag{6}$$

When the lower limit of the formula (6) is exceeded, the first lens group I and the second lens group II mechanically interfere with each other on the telephoto end. When the upper limit is exceeded, the overall lens length excessively increases and the effective diameter of the first lens group I further increases.

Incidentally, in the present invention, it is preferable to effect focussing by moving the zoom lens system forwardly since variations in aberrations are small. However, focussing may be carried out by moving either the first lens group I or the second lens group II. With this arrangement, it is possible to simplify the structure of a lens barrel. Furthermore, solely in the case of close-up photography, the second lens group II may be moved backward in order to compensate for a lack of brightness of the edge of the image field.

Numerical examples applied to the respective embodiments described above are shown below. In each of the numerical examples, Ri represents the radius of curvature of a lens element surface with the numbering starting from the object side, Di represents either the center thickness of a lens or the air separation of the ith element, Ni represents the refractive index of the glass of the ith lens element, and $\nu i$ represents the Abbe number of the glass of the ith lens element Table 1 shows the relationship between each of the aforesaid formulae and each of the numerical examples The configuration of the aspherical surface of a lens element within Group II is represented by the following expanded expression:

$$X = \frac{(1/R)H^2}{1 + \sqrt{1 - \left(\frac{H}{R}\right)^2}} + a_1H^2 + a_2H^4 + a_3H^6 + a_4H^8 + a_5H^{10} + a_6H^{12} + a_7H^{14}$$

where the X axis corresponds to the optical axis, the H axis corresponds to the direction perpendicular to the optical axis, the direction of light propagation corresponds to the positive direction, R represents the paraxial radius of curvature, H represents the height from the optical axis, and a1, a2, a3, a4, a5, a6, a7, b1, b2, b3 and b4 represent aspherical coefficients, respectively.

In the following numerical examples, an indication such as "D-03" is used to represent the value "$10^{-3}$".

NUMERICAL EXAMPLE 1

(F = 39-83 FNo. = 1:3.2-7 2ω = 58°-29°)

| | | | | | | |
|---|---|---|---|---|---|---|
| R 1 = | 20.88 | D 1 = 2.16 | N 1 = 1.68893 | | ν1 = 31.1 |
| R 2 = | 52.26 | D 2 = 1.92 | | | |
| R 3 = | −19.53 | D 3 = 5.00 | N 2 = 1.83400 | | ν2 = 37.2 |
| R 4 = | 19.53 | D 4 = 3.10 | N 3 = 1.51633 | | ν3 = 64.1 |
| R 5 = | −38.66 | D 5 = 0.40 | | | |
| R 6 = | 82.89 | D 6 = 2.67 | N 4 = 1.58913 | | ν4 = 61.2 |
| R 7 = | −23.90 | D 7 = 0.15 | | | |
| R 8 = | 195.42 | D 8 = 2.30 | N 5 = 1.58913 | | ν5 = 61.2 |
| R 9 = | −32.86 | D 9 = variable | | | |
| R10 = | −38.90 | D10 = 2.43 | N 6 = 1.68893 | | ν6 = 31.1 |
| R11 = | −20.89 | D11 = 3.90 | | | |
| R12 = | −18.66 | D12 = 1.58 | N 7 = 1.71300 | | ν7 = 53.8 |
| R13 = | −83.12 | D13 = 2.35 | | | |
| R14 = | −21.99 | D14 = 1.30 | N 8 = 1.71300 | | ν8 = 53.8 |
| R15 = | −46.96 | D15 = 0.56 | | | |
| R16 = | −37.00 | D16 = 1.30 | N 9 = 1.62299 | | ν9 = 58.2 |
| R17 = | −66.40 | | | | |

| | Focal length | |
|---|---|---|
| | 39 | 83 |
| D9 | 14.34 | 3.76 |

NUMERICAL EXAMPLE 2

(F = 39-83 FNo. = 1:3.2-7 2ω = 58°-29°)

| | | | | | |
|---|---|---|---|---|---|
| R 1 = | 21.61 | D 1 = 2.42 | N 1 = 1.68893 | ν1 = 31.1 |
| R 2 = | 64.41 | D 2 = 2.12 | | |
| R 3 = | −20.22 | D 3 = 3.24 | N 2 = 1.83400 | ν2 = 37.2 |
| R 4 = | 16.94 | D 4 = 3.67 | N 3 = 1.51633 | ν3 = 64.1 |
| R 5 = | −32.52 | D 5 = 0.50 | | |
| R 6 = | 75.69 | D 6 = 3.45 | N 4 = 1.58913 | ν4 = 61.2 |
| R 7 = | −28.24 | D 7 = 0.15 | | |
| R 8 = | −325.60 | D 8 = 2.99 | N 5 = 1.58913 | ν5 = 61.2 |
| R 9 = | −24.72 | D 9 = variable | | |
| R10 = | −33.626 | D10 = 2.89 | N 6 = 1.68893 | ν6 = 31.1 |
| R11 = | −20.366 | D11 = 4.30 | | |
| R12 = | −16.777 | D12 = 1.30 | N 7 = 1.71300 | ν7 = 53.8 |
| R13 = | −46.911 | D13 = 2.35 | | |
| R14 = | −19.405 | D14 = 1.30 | N 8 = 1.62299 | ν8 = 58.2 |
| R15 = | −120.508 | | | |

| | Focal length | |
|---|---|---|
| | 39 | 83 |
| D9 | 13.74 | 3.81 |

R11: asphere
$a_1 = 0$, $a_2 = -5.1$ D-06, $a_3 = 7.85$ D-09,
$a_4 = -9.67$ D-18, $a_5 = 7.2$ D-12

NUMERICAL EXAMPLE 3

(F = 39-88 FNo. = 1:3.1-7 2ω = 58°-27.6°)

| | | | | | |
|---|---|---|---|---|---|
| R 1 = | 21.59 | D 1 = 2.69 | N 1 = 1.68893 | ν1 = 31.1 |
| R 2 = | 58.65 | D 2 = 2.21 | | |
| R 3 = | −19.46 | D 3 = 3.08 | N 2 = 1.83400 | ν2 = 37.2 |
| R 4 = | 17.01 | D 4 = 3.68 | N 3 = 1.51633 | ν3 = 64.1 |
| R 5 = | −31.20 | D 5 = 0.50 | | |
| R 6 = | 62.43 | D 6 = 3.69 | N 4 = 1.58913 | ν4 = 61.2 |
| R 7 = | −26.28 | D 7 = 0.15 | | |
| R 8 = | −219.02 | D 8 = 2.27 | N 5 = 1.58913 | ν5 = 61.2 |
| R 9 = | −26.16 | D 9 = variable | | |
| R10 = | −33.09 | D10 = 2.59 | N 6 = 1.68893 | ν6 = 31.1 |
| R11 = | −19.40 | D11 = 3.79 | | |
| R12 = | −16.53 | D12 = 1.30 | N 7 = 1.71300 | ν7 = 53.8 |
| R13 = | −52.30 | D13 = 2.95 | | |
| R14 = | −19.59 | D14 = 1.30 | N 8 = 1.62299 | ν8 = 58.2 |
| R15 = | −106.41 | | | |

| | Focal length | |
|---|---|---|
| | 39 | 88 |
| D9 | 14.35 | 3.94 |

R11: asphere
$a_1 = 0$,
$a_2 = -4.37$ D-06, $a_3 = 3.67$ D-08,
$a_4 = -1.16$ D-09, $a_5 = 8.25$ D-12

NUMERICAL EXAMPLE 4

(F = 39-83 FNo. = 1:3.2-7 2ω = 58°-29°)

| | | | | | |
|---|---|---|---|---|---|
| R 1 = | 20.69 | D 1 = 2.03 | N 1 = 1.68893 | ν1 = 31.1 |
| R 2 = | 51.09 | D 2 = 1.92 | | |

-continued

NUMERICAL EXAMPLE 4

| | | | | | |
|---|---|---|---|---|---|
| R 3 = | −19.23 | D 3 = 5.00 | N 2 = 1.83400 | v2 = 37.2 |
| R 4 = | 20.01 | D 4 = 3.32 | N 3 = 1.51633 | v3 = 64.1 |
| R 5 = | −32.02 | D 5 = 0.40 | | |
| R 6 = | 74.04 | D 6 = 2.68 | N 4 = 1.58913 | v4 = 61.2 |
| R 7 = | −22.81 | D 7 = 0.15 | | |
| R 8 = | 354.08 | D 8 = 2.02 | N 5 = 1.58913 | v5 = 61.2 |
| R 9 = | −40.48 | D 9 = variable | | |
| R10 = | −37.011 | D10 = 2.56 | N 6 = 1.68893 | v6 = 31.1 |
| R11 = | −21.096 | D11 = 4.42 | | |
| R12 = | −16.135 | D12 = 1.30 | N 7 = 1.71300 | v7 = 53.8 |
| R13 = | −142.031 | D13 = 3.21 | | |
| R14 = | −21.007 | D14 = 1.30 | N 8 = 1.62299 | v8 = 58.2 |
| R15 = | −39.782 | | | |

| | Focal length | |
|---|---|---|
| | 39 | 83 |
| D9 | 14.45 | 3.88 |

R: asphere
$a_1 = 0$, $a_2 = -6.94\,D\text{-}06$, $a_3 = 6.13\,D\text{-}08$,
$a_4 = -1.86\,D\text{-}09$, $a_5 = 1.45\,D\text{-}11$, $a_6 = 0$,
$a_7 = -3.43\,D\text{-}16$

TABLE 1

| | Numerical examples | | | |
|---|---|---|---|---|
| Formulae | 1 | 2 | 3 | 4 |
| (1) D1/fW | 0.049 | 0.054 | 0.057 | 0.051 |
| (2) D3/fW | 0.128 | 0.08 | 0.079 | 0.132 |
| (3) D5/fW | 0.01 | 0.013 | 0.012 | 0.011 |
| (4) N2 | 1.834 | 1.834 | 1.834 | 1.834 |
| (5) $l_T$ | 0.15 | 0.68 | 1.06 | 2.20 |
| (6) D9/fW | 0.37 | 0.35 | 0.37 | 0.37 |

In numerical example 1, the second lens group II includes no aspherical lens element, and is constituted by four lens elements as a whole.

In each of numerical examples 2 to 4, the second lens group II includes an aspherical lens element, and is constituted by three lens elements as a whole.

The above description refers to the case where aberration corrections are effected primarily on the front lens group of a negative-positive, two-group type of zoom lens. In the following description, aberration corrections are effected primarily on the rear lens group. As a matter of course, it is possible to apply each of the arrangements (to be described later) to both of the front and rear lens groups.

In a two-group zoom lens which will be described later, the following conditions are preferably satisfied for all values of N2X:

$$0.7 < |\Delta 2|/(fT - fW) < 1.0 \tag{7}$$

$$1.55 < N2X_i < 1.8 \tag{8}$$

$$45 < v2N_{MIN} \tag{9}$$

$$v2P_{MAX} < 40 \tag{10}$$

where $\Delta 2$ represents the amount of movement of the second lens group II during zooming; fW represents the focal length of the zoom lens when it is set at the wide-angle end; fT represents the focal length of the zoom lens when it is set at the telephoto end; N2Xi represents the refractive index of the material of the ith lens element within the second lens group II; $v2P_{MAX}$ represents the highest Abbe number of the material of the positive lenses that constitute the second lens group II; and $v2N_{MIN}$ represents the lowest Abbe number of the material of the negative lenses that constitute the second lens group II. In other words, the stated conditions should be satisfied by the refractive index and Abbe number values for all of the lens elements making up the second lens group II.

FIGS. 10 to 13 are cross-sectional views which respectively show zoom lenses assembled in accordance with numerical examples 5 to 8 and which will be described in more detail later. In each of FIGS. 10 to 13, part (A) shows the zoom lens when it is set at its wide-angle end, while part (B) shows the zoom lens when it is set at its telephoto end.

In each of the FIGS. 10-13, the illustrated zoom lens includes a first lens group I of positive refractive power and a second lens group II of negative refractive power, and is so arranged that the first and second lens groups I and II can be moved toward the object side as indicated by arrows while the air separation interval between the lens groups I and II is being decreased, thereby enabling the angle of view to be varied from its wide-angle end to its telephoto end.

In each of the embodiments shown in FIGS. 10 to 13, the amount of movement of the first lens group II of negative refractive power and the properties of the material of each lens element of the second lens group II are selected as described above. Accordingly, even in the case of a two-group type zoom lens having a zoom ratio of 2x or more, it is possible to achieve good correction of coma which occurs to a large extent on the wide-angle end, as well as various other aberrations such as spherical aberration and the curvature of field due to zooming.

The following is an explanation of the technical meaning of each of the above noted formulae.

The formula (7) serves to specify the ratio of the amount of movement of the second lens group II and the amount of variation in the focal length of the zoom lens system during zooming.

In general, in the case of a zoom lens system constituted by two lens groups, if the so-called Newton's equation is expanded, the back focal length SK' of the zoom lens system is given by $$SK' = f(1 - \phi 1 \cdot e) \tag{a}$$

where f represents the compound focal length of the two lens groups, $\phi 1$ represents the refractive power of the first lens group I, and e represents the air separation interval between the principal points of the first and second lens groups I and II. The amount $\Delta 2$ of movement of the second lens group represented by the formula (7) is equivalent to the difference between a back focal length SK'T at the telephoto end and a back focal length SK'W at the wide-angle end. If the air separation intervals between the principal points of the first lens group I and the second lens group II at the wide-angle end and the telephoto end are represented by eW and eT, respectively, the following equation is obtained:

$$\begin{aligned}\Delta 2 &= SK'T - SK'W \\ &= (fT - fW) - \phi 1(fT \cdot eT - fW \cdot eW)\end{aligned} \tag{b}$$

When the equation (b) is compared with the formula (1), the following equation is obtained:

$$\Delta 2/(fT - fW) = 1 - \phi 1 \cdot \frac{fT \cdot eT - fW \cdot eW}{fT - fW} \quad (c)$$

If the formula (7) is combined with the equation (c), the following formula is obtained:

$$0 < \phi 1 \cdot \frac{fT \cdot eT - fW \cdot eW}{fT - fW} < 0.3 \quad (7a)$$

As can be seen from the formula (7a), this formula has no requirement that the second lens group II have an amount of movement Δ2 and, instead is determined by characteristics of the first lens group I, such as the respective focal lengths at the wide-angle end and the telephoto end, and the air separation intervals between the principal points of the first and second lens groups I and II at the wide-angle end and the telephoto end, respectively.

The conditions of the formula (7) are restricted by taking account into the factors mentioned above. If the upper limit of the formula (7) is exceeded, the principal-point interval eW becomes excessively large or the amount of movement of the second lens group II increases, so that the zoom lens length increases. On other hand, if the lower limit of the formula (7) is exceeded, that is, if the upper limit of the formula (7a) is exceeded, it becomes difficult to obtain the desired zoom ratio or the principal-point interval eT becomes excessively large, so that the overall zoom lens length increases. Accordingly, it has been found not desirable to let either the upper or lower limit of the formula (7) be exceeded.

The formula (8) serves to restrict the range of the refractive index of the material of each of the positive and negative lens elements which constitute the second lens group II. In the two-group type zoom lens according to each of the present embodiments, it is desirable that the difference between the refractive indices of the materials of a positive lens element and the negative lens element which constitute the second lens group II be made as small as possible in terms of aberration corrections. The conditions of the formula (8) are restricted on the basis of this view point and, if the lower limit of the formula (8) is exceeded, the Petzval sum becomes excessively small and the curvature of field undergoes over-correction. In addition, a large amount of outward coma occurs on the telephoto end and, on the wide-angle end, positive distortion increases. Accordingly, it is not desirable to exceed the formula (8) lower limit. On the other hand, if the upper limit of the formula (8) is exceeded, the Petzval sum increases and the curvature of field undergoes under-correction. Furthermore, since a variation in the image surface becomes large in an intermediate region of the zooming range, it is not desirable to exceed the lower limit, either.

The formulae (9) and (10) serve to suppress the occurrence of chromatic aberration, particularly, the occurrence of lateral chromatic aberration. If the formula (9) and (10) are not satisfied, the extent of variation of the lateral chromatic aberration due to zooming becomes large.

In order to achieve good correction of variations in the curvature of field due to zooming and to reduce the size of the zoom lens system while maintaining its optical performance at a satisfactory level, the second lens group II is preferably constituted by four lens elements each having a concave lens surface that faces the object side.

This construction is based upon a requirement to make all the lens elements of the second lens group II concentric with respect to a diaphragm (not shown), that is disposed in the vicinity of the first lens group I. Thus, it is possible to achieve good correction of variations in the curvature of field due to zooming.

In order to achieve good correction of negative distortion, particularly at the wide-angle end, it is desirable to arrange the four lens elements of the second lens group II so that one positive lens element and three negative lens elements may be aligned in that order from the object side.

In addition, as shown in FIGS. 10 to 13, in order to achieve good correction of distortion and outward coma on the telephoto side as well as the curvature of field due to zooming, the second lens group II is preferably constituted by four lens elements: a positive meniscus-shaped lens element 21 with a concave surface that faces the object side; a negative meniscus-shaped lens element 22 with a concave surface that faces the object side; a negative meniscus-shaped lens element 23 with a concave surface that faces the object side; and a negative meniscus-shaped lens element 24 with a concave surface that faces the object side.

The compound focal length f of the two-group type zoom lens constituted by the first lens group I and the second lens group II is represented by $$1/f = 1/f1 + 1/f2 - e/f1 \cdot f2 \quad (d)$$

where f1 represents the focal length of the second lens group I, f2 represents the focal length of the second lens group II, and e represents the air separation interval between the principal points of the first and second lens groups I and II.

In the equation (d), since the focal lengths f1 and f2 are fixed, a variation in magnification due to zooming depends upon a variation in the principal-point air separation interval e. In order to increase the range of zooming, that is, the zoom ratio, it is preferable to increase the amount of variation in the principal-point interval e from the wide-angle end to the telephoto end. However, an increase in the overall zoom lens length will result.

Accordingly, in order to extend the range of zooming while achieving an overall reduction in the overall size of the zoom lens system, if the absolute values of the respective focal lengths f1 and f2 in the term e/f1·f2 of the equation (d) are made small, the compound focal length f can be changed over a wide range by altering the principal-point air separation interval e to a small extent.

In the case of the two-group type zoom lens according to the present invention, if the above-described factors are taken into account, it is preferable to satisfy the following conditions:

$$0.55 < f1/fW < 0.85 \quad (e)$$

$$0.42 < |f2/fW| < 0.85 \quad (f)$$

If the upper limit of each of the expressions (e) and (f) is exceeded, the size of the zoom lens system increases. If the lower limit is exceeded the inclination of the image surface or a variation in the image surface increases due to a variation in the position of each lens group. Accordingly, it is not desirable to exceed the upper or lower limits of expressions (e) and (f).

In addition, in the present invention, it is preferable to satisfy the following condition:

$$0.8 < f1/f2 < 1.5 \quad (g)$$

It is thus possible to easily obtain the desired zoom ratio without the need to increase the amount of movement of the second lens group II to an excessive extent. If the upper limit of the expression (g) is exceeded, the overall size of the lens system increases, whereas, if the lower limit is exceeded, an inclination in the curvature of field increases throughout the range of zooming. Accordingly, it is not desirable to exceed either the upper or lower limit of the expression (g).

In order to maintain optical performance at a satisfactory level throughout the zooming range for a zoom ratio of approximately 2.5x, the first lens group I is preferably constituted by four or five lens elements: a positive meniscus-shaped first lens element 11 with a convex surface that faces the object side; a meniscus-shaped second lens element 12 with opposite lens surfaces that are concave; a third lens element 13 with opposite lens surfaces that are convex; and one or two positive lens elements, 14 or 15. The lens element 12 and the lens element 13 may be disposed separately or in a cemented form.

Numerical examples 5 to 8 applied to the respective embodiments described above are shown below. In each of the numerical examples, Ri represents the radius of curvature of a lens element surface with the numbering starting from the object side. Di represents either the center thickness of a lens or the air separation interval between lenses measured from the object side. Ni represents the refractive index of the glass of the ith lens element, and vi represents the Abbe number of the glass of the ith lens element.

Table 2 shows the relationship between each of the aforesaid formulae and each of the numerical examples.

NUMERICAL EXAMPLE 5

$(F = 39.10-83.0 \text{ FNo.} = 1:3.2-6.95\ 2\omega = 57.9°-29.2°)$

| R 1 = | 20.88 | D 1 = 2.16 | N 1 = 1.68893 | v1 = 31.1 |
|---|---|---|---|---|
| R 2 = | 52.26 | D 2 = 1.92 | | |
| R 3 = | −19.53 | D 3 = 5.00 | N 2 = 1.83400 | v2 = 37.2 |
| R 4 = | 19.53 | D 4 = 3.10 | N 3 = 1.51633 | v3 = 64.1 |
| R 5 = | −38.66 | D 5 = 0.35 | | |
| R 6 = | 82.89 | D 6 = 2.67 | N 4 = 1.58913 | v4 = 61.2 |
| R 7 = | −23.90 | D 7 = 0.15 | | |
| R 8 = | 195.42 | D 8 = 2.30 | N 5 = 1.58913 | v5 = 61.2 |
| R 9 = | −32.86 | D 9 = 1.20 | | |
| R10 = | diaphragm | D10 = variable | | |
| R11 = | −58.33 | D11 = 3.00 | N 6 = 1.62004 | v6 = 36.3 |
| R12 = | −20.17 | D12 = 3.16 | | |
| R13 = | −17.92 | D13 = 1.10 | N 7 = 1.69680 | v7 = 55.5 |
| R14 = | −191.67 | D14 = 1.65 | | |
| R15 = | −32.64 | D15 = 1.50 | N 8 = 1.60311 | v8 = 60.7 |
| R16 = | −47.65 | D16 = 1.93 | | |
| R17 = | −23.01 | D17 = 1.30 | N 9 = 1.69680 | v8 = 55.5 |
| R18 = | −52.15 | | | |

| | Focal length | | |
|---|---|---|---|
| Variable interval | W | M | T |
| | 39.11 | 56.66 | 83.00 |
| D10 | 12.78 | 6.59 | 2.22 |

NUMERICAL EXAMPLE 6

$(F = 43.53-101.4 \text{ FNo.} = 1:3.63-8.48\ 2\omega = 52.9°-24.1°)$

| R 1 = | 20.59 | D 1 = 2.20 | N 1 = 1.64769 | v1 = 33.8 |
|---|---|---|---|---|
| R 2 = | 56.61 | D 2 = 2.09 | | |
| R 3 = | −19.53 | D 3 = 5.00 | N 2 = 1.83400 | v2 = 37.2 |
| R 4 = | 19.53 | D 4 = 3.10 | N 3 = 1.51633 | v3 = 64.1 |
| R 5 = | −38.66 | D 5 = 0.40 | | |
| R 6 = | 82.89 | D 6 = 2.67 | N 4 = 1.58913 | v4 = 61.2 |
| R 7 = | −23.90 | D 7 = 0.15 | | |
| R 8 = | 195.42 | D 8 = 2.30 | N 5 = 1.58913 | v5 = 61.2 |
| R 9 = | −32.86 | D 9 = 1.20 | | |
| R10 = | diaphragm | D10 = variable | | |
| R11 = | −64.97 | D11 = 2.93 | N 6 = 1.68893 | v6 = 31.1 |
| R12 = | −21.33 | D12 = 0.56 | | |
| R13 = | −41.20 | D13 = 1.10 | N 7 = 1.69680 | v7 = 55.5 |
| R14 = | −131.22 | D14 = 2.59 | | |
| R15 = | −21.47 | D15 = 1.50 | N 8 = 1.69680 | v8 = 55.5 |
| R16 = | −66.78 | D16 = 3.86 | | |
| R17 = | −15.82 | D17 = 1.30 | N 9 = 1.77250 | v8 = 49.6 |
| R18 = | −44.23 | | | |

| | Focal length | | |
|---|---|---|---|
| Variable interval | W | M | T |
| | 43.53 | 78.27 | 101.43 |
| D10 | 11.16 | 4.30 | 2.33 |

NUMERICAL EXAMPLE 7

$(F = 44.8-103.0 \text{ FNo.} = 1:3.8-8.6\ 2\omega = 51.5°-23.7°)$

| R 1 = | 20.88 | D 1 = 2.16 | N 1 = 1.68893 | v1 = 35.0 |
|---|---|---|---|---|
| R 2 = | 52.26 | D 2 = 1.92 | | |
| R 3 = | −19.53 | D 3 = 5.00 | N 2 = 1.83400 | v2 = 37.2 |
| R 4 = | 19.53 | D 4 = 3.10 | N 3 = 1.51633 | v3 = 64.1 |
| R 5 = | −38.66 | D 5 = 0.35 | | |
| R 6 = | 82.89 | D 6 = 2.67 | N 4 = 1.58913 | v4 = 61.2 |
| R 7 = | −23.90 | D 7 = 0.15 | | |
| R 8 = | 195.42 | D 8 = 2.30 | N 5 = 1.58913 | v5 = 61.2 |
| R 9 = | −32.86 | D 9 = 1.20 | | |
| R10 = | diaphragm | D10 = variable | | |
| R11 = | 149.70 | D11 = 2.82 | N 6 = 1.68893 | v = 31.1 |
| R12 = | −22.56 | D12 = 0.51 | | |
| R13 = | −41.16 | D13 = 1.10 | N 7 = 1.74320 | v7 = 49.3 |
| R14 = | 146.60 | D14 = 3.54 | | |
| R15 = | −17.44 | D15 = 1.50 | N 8 = 1.69680 | v8 = 55.5 |
| R16 = | −29.54 | D16 = 3.86 | | |
| R17 = | −16.13 | D17 = 1.30 | N 9 = 1.77250 | v8 = 49.6 |
| R18 = | −43.19 | | | |

| | Focal length | | |
|---|---|---|---|
| Variable interval | W | M | T |
| | 44.82 | 79.72 | 102.99 |
| D10 | 10.90 | 4.34 | 2.43 |

NUMERICAL EXAMPLE 8

$(F = 39.5-84.8 \text{ FNo.} = 1:3.8-7.7\ 2\omega = 57.4°-28.6°)$

| R 1 = | 16.16 | D 1 = 2.25 | N 1 = 1.58267 | v1 = 46.4 |
|---|---|---|---|---|
| R 2 = | 65.30 | D 2 = 1.50 | | |
| R 3 = | −18.38 | D 3 = 2.31 | N 2 = 1.72342 | v2 = 37.9 |
| R 4 = | 25.47 | D 4 = 0.31 | | |
| R 5 = | −41.86 | D 5 = 4.76 | N 3 = 1.51633 | v3 = 64.1 |
| R 6 = | −16.80 | D 6 = 0.16 | | |
| R 7 = | 64.91 | D 7 = 1.96 | N 4 = 1.56384 | v4 = 60.7 |
| R 8 = | −30.00 | D 8 = 1.2 | | |
| R 9 = | diaphragm | D 9 = variable | | |
| R10 = | −44.66 | D10 = 2.83 | N 5 = 1.62004 | v5 = 36.3 |
| R11 = | −17.18 | D11 = 2.61 | | |
| R12 = | −15.01 | D12 = 1.10 | N 6 = 1.69680 | v6 = 35.5 |
| R13 = | −94.74 | D13 = 1.22 | | |
| R14 = | −32.14 | D14 = 1.50 | N 7 = 1.60311 | v7 = 60.7 |
| R15 = | −37.74 | D15 = 1.92 | | |
| R16 = | −20.26 | D16 = 1.30 | N 8 = 1.69680 | v8 = 55.5 |
| R17 = | −49.44 | | | |

| | Focal length | | |
|---|---|---|---|
| Variable | W | M | T |

-continued

NUMERICAL EXAMPLE 8

| interval | 39.54 | 57.64 | 84.78 |
|---|---|---|---|
| D9 | 12.10 | 6.09 | 1.88 |

TABLE 2

| Formulae | Numerical examples | | | |
|---|---|---|---|---|
| | 5 | 6 | 7 | 8 |
| (7) $|\Delta 2|/(fT-fW)$ | 0.959 | 0.829 | 0.825 | 0.931 |
| (8) N2X MAX | 0.69680 | 1.77250 | 1.77250 | 1.69680 |
| MIN | 1.60311 | 1.77250 | 1.68893 | 1.60311 |
| (9) $\nu 2N$ MIN | 55.5 | 49.6 | 49.3 | 55.5 |
| (10) $\nu 2P$ MAX | 36.3 | 31.1 | 31.1 | 36.3 |
| (e) $f1/fW$ | 0.73 | 0.65 | 0.64 | 0.72 |
| (f) $|f2|/fW$ | 0.70 | 0.54 | 0.53 | 0.67 |
| (g) $|f1|/|f2|$ | 1.04 | 1.20 | 1.21 | 1.07 |

In accordance with the present invention, it is, therefore, possible to achieve a zoom lens having high optical performance, a reduced overall lens length, a zoom ratio between approximately 2x and 2.5x and a corresponding photographic angle of view by utilizing any of the above-described lens constructions which include two lens groups of predetermined refractive power.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. In a zoom lens of compact size having a front lens group of positive refractive power and a rear lens group of negative refractive power which are aligned in that order from the object side of said zoom lens, said zoom lens being so arranged that its magnification can be varied by altering the air separation interval between said front lens group and said rear lens group, the improvement comprising a front lens group including a first meniscus-shaped lens element of positive refractive power with a convex surface that faces said object side, a second lens element with opposite lens surfaces that are concave, a third lens element with opposite lens surfaces that are convex, a fourth positive lens element with a convex surface that faces the image-surface side of said zoom lens, and a fifth positive lens element with a convex surface that faces said image-surface side, said second lens and said third lens elements constituting a cemented lens, and wherein said front and rear lens groups are construed and arranged to satisfy the following conditions:

$$0.015 < D2/fW < 0.07$$

$$0.079 \leq D3/fW < 0.2$$

$$0.005 < D5/fW < 0.018$$

where D2 represents the air separation interval between said first lens element and said second lens elements; D5 represents the air separation interval between said third lens elements and said fourth lens elements; D3 represents the center thickness of said second lens elements; and fW represents the focal length of the overall zoom lens when it is set at its wide-angle end.

2. A compact zoom lens according to claim 1, wherein the following condition also is satisfied:

$$1.7 < N2$$

wherein N2 represents the refractive index of said second lens element.

3. A compact zoom lens according to claim 1, wherein, on the basis of an acceptable third-order spherical aberration coefficient at its wide-angle end, a third-order aberration coefficient It at its telephoto end for an object at infinity satisfies the following condition:

$$0.5 < It < 4$$

4. A compact zoom lens according to claim 1, wherein the following condition also is satisfied:

$$0.3 < D9w/fW < 0.5$$

where D9W represents the air separation interval between said front lens group and said rear group when the zoom lens is set at its wide-angle end.

5. In a compact zoom lens having a front lens group of positive refractive power and a rear lens group of negative refractive power which are aligned in that order from the object side of said compact zoom lens, said compact zoom lens being so arranged that its magnification can be varied by altering the air separation interval between said front lens group and said rear lens group, the improvement comprising front and rear lens groups constructed and arranged of lens elements to satisfy the following condition:

$$0.7 < |\Delta 2|/(fT-fW) < 1.0$$

$$1.55 < N2X_i < 1.8$$

$$45 < \nu 2N_{MIN}$$

$$\nu 2P_{MAX} < 40$$

where $\Delta 2$ represents the amount of movement of said rear lens group during zooming, fW represents the focal length of said zoom lens when it is set at its wide-angle end, fT represents the focal length of said zoom lens when it is set at its telephoto end, $N2X_i$ represents the refractive index of the material of the lens elements comprising said rear group, $\nu 2PMAX$ represents the highest Abbe number from all of the positive lens element materials which constitute said rear lens group, and $\nu 2N_{MIN}$ represents the lowest Abbe number from all of the negative lens element materials which constitutes said rear lens group.

6. A compact zoom lens according to claim 5, wherein said rear lens group includes four lens elements each having a concave surface that faces said object side.

7. A compact zoom lens according to claim 6, wherein said rear lens group includes one positive lens element and three negative lens elements.

8. A compound zoom lens according to claim 5, wherein said rear lens group includes one positive lens element and three negative lens elements.

9. A compact zoom lens according to claim 5, wherein said rear lens group includes a first positive meniscus-shaped lens element with a concave surface that faces said object side, a second negative meniscus-shaped lens element with a concave surface that faces said object side, and a third negative meniscus-shaped lens element with a concave surface that faces said object side.

10. A compact zoom lens according to claim 5, wherein said front lens group includes a first meniscus-shaped lens element of positive refractive power with a convex surface that faces said object side, a second lens element with opposite lens surfaces that are concave, a third lens element with opposite lens surfaces that are convex, a fourth positive lens element with a convex surface that faces the image-surface side, said second lens element and said third lens element constituting a cemented lens, and wherein the following conditions are satisfied:

$$0.015 < D2/fW < 0.07$$

$$0.06 < D3/fW < 0.2$$

$$0.005 < D5/fW < 0.018$$

where D2 represents the air separation interval between said first lens element and said second lens element; D5 represents the air separation interval between said third lens element and said fourth lens element; D3 represents the center thickness of said second lens element; and fW represents the focal length of the zoom lens when it is set at its wide-angle end.

* * * * *

UNITED STATES PATENT AND TRADEMARK OFFICE
CERTIFICATE OF CORRECTION

PATENT NO. : 5,113,287   Page 1 of 3
DATED : May 12, 1992
INVENTOR(S) : HIROKI NAKAYAMA It is certified that error appears in the above-identified patent and that said Letters Patent is hereby corrected as shown below:

On the title page:

Item [30]:

Please add --January 20, 1989 [JP] Japan............011291--.

Column 3:

Line 12, "$\upsilon 2P_{MAX}$," should read --$\upsilon 2P_{MAX}$--.

Column 4:

Line 14, "PREFERRED" should read --THE PREFERRED--.

Line 40, "0.015 < D2/fW < 0     (1)" should read --0.015 < D2/fW < 0.07     (1)--.

Column 5:

Line 22, "above noted formulae" should read --above-noted formulae--.

Column 6:

Line 31, "on" should read --an--.

Column 7:

Line 37, "examples" should read --examples.--.

UNITED STATES PATENT AND TRADEMARK OFFICE
CERTIFICATE OF CORRECTION

PATENT NO. : 5,113,287

DATED : May 12, 1992

INVENTOR(S) : HIROKI NAKAYAMA

It is certified that error appears in the above-identified patent and that said Letters Patent is hereby corrected as shown below:

Column 9:

Line T1, Q: "(1) D1/fW" should read --(1) D2/fW--.

Line 65, "N2Xi" should read --N2X$_1$--.

Column 10:

Line 37, "above noted" should read --above-noted--.

Column 11:

Line 21, "account into" should read --into account--.

Line 25, "other" should read --the other--.

Line 45, "view point" should read --viewpoint--.

Column 12:

Line 33, "second" should read --first--.

Line 67, "exceeded" should read --exceeded,--.

Column 14:

Line Num. Ex. 7, "$\upsilon$=31.1" should read --$\upsilon 6$=31.1--, and "$\upsilon 8$=49.6" should read --$\upsilon 9$=49.6--.

Line Num. Ex. 8, "R5= -41.86" should read R5= 41.86--, and "$\upsilon 6$=35.5" should read --$\upsilon 6$=55.5--.

UNITED STATES PATENT AND TRADEMARK OFFICE
CERTIFICATE OF CORRECTION

PATENT NO. : 5,113,287
DATED : May 12, 1992
INVENTOR(S) : HIROKI NAKAYAMA

It is certified that error appears in the above-identified patent and that said Letters Patent is hereby corrected as shown below:

Column 15:

Line T2, "(f1-fW)" should read --(fT-fW)--, and "0.69680" should read --1.69680--.

Line 56, Q: "construed" should read --constructed--.

Column 16:

Line 24, "0.3 < D9w/fW < 0.5" should read --0.3 < D9W/fW < 0.5--.

Line 39, "condition:" should read --conditions:--.

Line 58, "υ2PMAX" should read --υ2P$_{MAX}$--.

Signed and Sealed this

Seventh Day of September, 1993

*Attest:*

BRUCE LEHMAN

*Attesting Officer*  *Commissioner of Patents and Trademarks*